(12) United States Patent
Salhab

(10) Patent No.: US 10,491,301 B2
(45) Date of Patent: Nov. 26, 2019

(54) MULTI-USER MIXED MULTI-HOP RELAY NETWORK

(71) Applicant: KING FAHD UNIVERSITY OF PETROLEUM AND MINERALS, Dhahran (SA)

(72) Inventor: Anas M. Salhab, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 15/844,021

(22) Filed: Dec. 15, 2017

(65) Prior Publication Data
US 2019/0132050 A1  May 2, 2019

Related U.S. Application Data

(60) Provisional application No. 62/578,090, filed on Oct. 27, 2017.

(51) Int. Cl.
*H04B 10/112* (2013.01)
*H04B 10/29* (2013.01)
*H04B 10/116* (2013.01)

(52) U.S. Cl.
CPC .......... *H04B 10/29* (2013.01); *H04B 10/116* (2013.01)

(58) Field of Classification Search
CPC .. H04B 10/1123–1129; H04B 10/1143; H04B 10/1149
See application file for complete search history.

(56) References Cited

U.S. PATENT DOCUMENTS

| 8,787,428 B2 | 7/2014 | Dai et al. | |
| 2007/0053134 A1* | 3/2007 | Kramer | H04B 7/15542 361/160 |

(Continued)

FOREIGN PATENT DOCUMENTS

| CN | 101909286 A | 12/2010 |
| CN | 103068027 B | 4/2015 |

(Continued)

OTHER PUBLICATIONS

T. D. Pham et al., "Performance Evaluation of an Advanced DWDM RoFSO System for Heterogeneous Wireless," GLOBECOM 2009—2009 IEEE Global Telecommunications Conference, Honolulu, HI, 2009, pp. 1-6. doi: 10.1109/GLOCOM.2009.5426142. (Year: 2009).*

(Continued)

*Primary Examiner* — Nathan M Cors
(74) *Attorney, Agent, or Firm* — Oblon, McClelland, Maier & Neustadt, L.L.P.

(57) ABSTRACT

The present disclosure relates to a triple-hop multiuser relay network. Further, the relay network is comprised of mixed communication mediums (radiofrequency/free-space optical/radiofrequency), and utilizes a generalized order user scheduling scheme for determining the next source or destination to be selected for transmission. Closed-form expressions were achieved to describe outage probability, average symbol error probability, and channel capacity assuming Rayleigh and Gamma-Gamma fading models for the radiofrequency and free-space optical links, respectively. The effects of pointing errors on the free-space optical link were also considered. Additionally, a power allocation algorithm was proposed to optimize power allocation at each hop.

18 Claims, 12 Drawing Sheets

(56) References Cited

U.S. PATENT DOCUMENTS

| | | | | |
|---|---|---|---|---|
| 2009/0067846 A1* | 3/2009 | Yu | ................... | H04B 10/1143 |
| | | | | 398/128 |
| 2012/0076509 A1* | 3/2012 | Gurovich | ............ | H04B 10/116 |
| | | | | 398/212 |
| 2015/0071267 A1* | 3/2015 | Wu | ................... | H04W 52/50 |
| | | | | 370/336 |

FOREIGN PATENT DOCUMENTS

| | | |
|---|---|---|
| CN | 104485987 A | 4/2015 |
| CN | 103139864 B | 10/2015 |
| CN | 103354651 B | 12/2015 |

OTHER PUBLICATIONS

Salhab, A.M., "Performance of Multiuser Mixed RF/FSO Relay Networks with Generalized Order User Scheduling and Outdated Channel Information", URL: https://link.springer.com/article/10.1007/s13369-015-1764-0, Arabian Journal for Science and Engineering, vol. 40, 2 Pages total, (2015).

Varshney, N., et al., "Cognitive Decode-and-Forward MIMO-RF/FSO Cooperative Relay Networks", URL: http://ieeexplore.ieee.org/stamp/stamp.jsp?arnumber=7803614, IEEE Communications Letters, vol. 21, No. 4, pp. 893-896, (Apr. 2017).

Khan, M.H.D., et al., "Performance Analysis of Power Allocation and Relay Location in a Cooperative Relay Network", URL: http://ieeexplore.ieee.org/stamp/stamp.jsp?arnumber=7224908, ICACT Transactions on Advanced Communications Technology (TACT), vol. 3, Issue 3, pp. 444-449, (May 2014).

* cited by examiner

MULTI-USER MIXED MULTI-HOP RELAY NETWORK

CROSS-REFERENCE TO RELATED APPLICATIONS

The present application claims priority to U.S. Provisional Application No. 62/578,090, filed Oct. 27, 2017, the teaching of which is hereby incorporated by reference in its entirety for all purposes.

STATEMENT REGARDING PRIOR DISCLOSURE BY THE INVENTORS

Aspects of this technology are described in an article "A new scenario of triple-hop mixed RF/FSO/RF relay network with generalized order user scheduling and power allocation" published in EURASIP Journal on Wireless Communications and Networking, on Oct. 28, 2016, which is incorporated herein by reference in its entirety.

BACKGROUND

Field of the Disclosure

The present disclosure relates to a multi-hop relay network with generalized order user scheduling and transmission power allocation.

Description of the Related Art

Cooperative relay networks present an efficient solution for multipath fading issues in wireless communications. In these relay networks, a relay node or a set of relay nodes facilitate propagation of a message from one or more source nodes to one or more destination nodes, thereby providing diversity, widening coverage area, and reducing the need for high power transmitters. Pursuant to network architecture and desired functionality, each node may employ either an amplify-and-forward (AF) or decode-and-forward (DF) scheme. The simplicity of AF schemes is often weighed against the computationally demanding, but improved output, of DF schemes.

Recent efforts to reduce power consumption, expand coverage and improve reliability of wireless communications have employed a mixture of data transmission modalities. By employing relays and varied transmission modalities, networks are able to increase communication distance and improve network diversity. To this end, several approaches have been explored, including single-relay free space optical (FSO) communications and dual-hop mixed radiofrequency (RF) and FSO relay networks. Further, by considering multiple users a network aims to achieve multiuser diversity.

While recent work has considered triple-hop relaying for only one type of transmission modality, broad advances have focused on dual-hop mixed RF/FSO relay networks, representative of applications where multiple users communicate with a relay node via RF links and the relay forwards their messages to a base station over an FSO link.

Therefore, one objective of the present disclosure is to provide and evaluate a model of triple-hop mixed-mode relaying in wireless networks.

The foregoing "Background" description is for the purpose of generally presenting the context of the disclosure. Work of the inventors, to the extent it is described in this background section, as well as aspects of the description which may not otherwise qualify as prior art at the time of tiling, are neither expressly or impliedly admitted as prior art against the present invention.

SUMMARY

The present disclosure relates to a triple-hop mixed RF/FSO/RF relay network with generalized order user scheduling and transmission power allocation.

The triple-hop mixed RF/FSO/RF relay network includes $K_1$ sources, two DF relays, and $K_2$ destinations. The sources and destinations are connected to respective relay nodes via RF links, while the relay nodes are connected via FSO link.

The generalized order user scheduling scheme selects the source with the $N_1^{th}$ best signal-to-noise ratio (SNR) among the available sources to communicate with the first relay node. Similarly, following transmission via FSO from the first relay node to the second relay node, the destination with the $N_2^{th}$ best SNR is selected to receive its message from the second relay.

Further, optimum transmission powers of the selected user are obtained on the first hop, first relay, and second relay.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Recently, incorporation of free-space optical communication in relay networks has been proposed to provide improved reliability in the 'last-mile' of wireless communications. These networks, often known as dual-hop relay networks, transmit a source message from a source to a relay node over a RF link (licensed frequencies) and then forward the message to the destination over an FSO link (license-free). In such networks, relays provide greater diversity among nodes, expand the coverage area, and reduce the need for high-power transmitters. Further, this approach can be complemented via multiuser cooperation and opportunistic scheduling.

Extensive work has been dedicated to the above, filling the connectivity gap in 'last-mile' connectivity while conserving economic resources and saving bandwidth by exploiting optical communications. To this point, however, FSO communications have been incorporated into dual-hop networks with the FSO link connecting directly to a base station at a terminus. Therefore, a triple-hop mixed relay network with generalized user scheduling and power allocation algorithm, yet to be developed, is described in the present disclosure.

Figure 1:
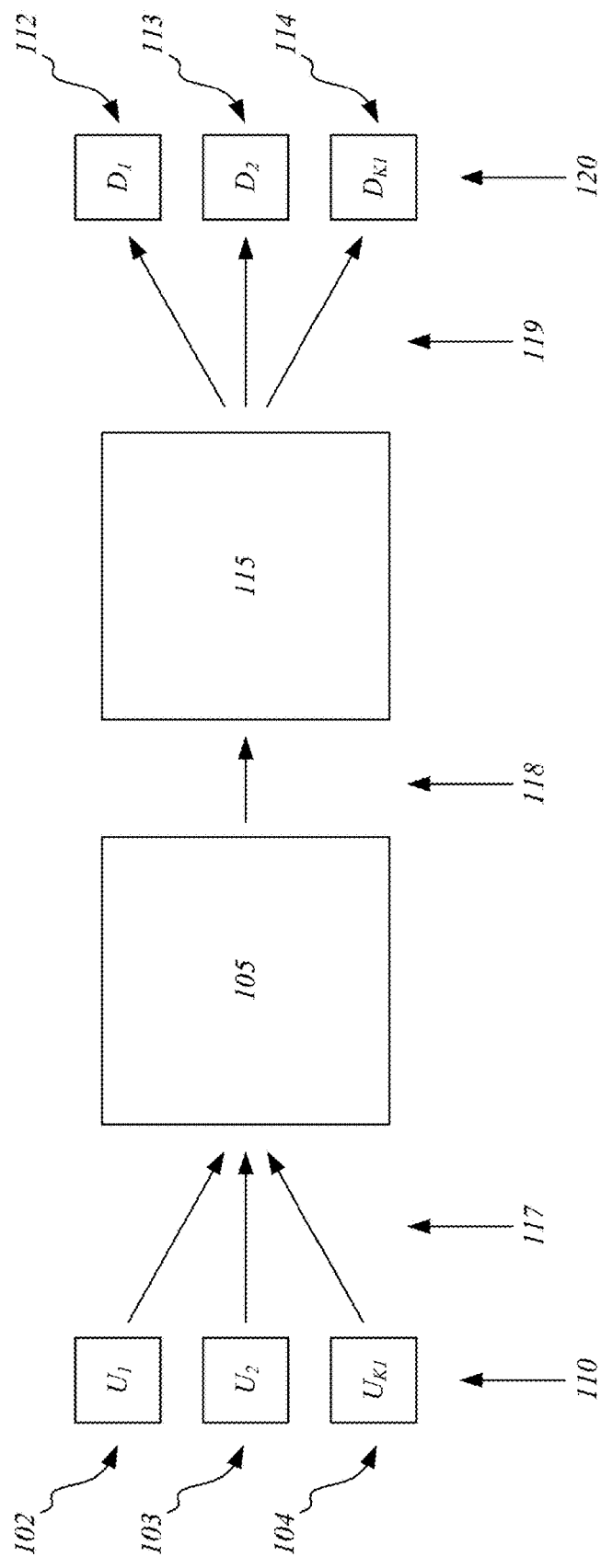
FIG. 1 is a schematic of a multiuser multi-hop mixed transmission modality network with generalized order user scheduling according to one or more aspects of the disclosed subject matter.

FIG. 1 shows a triple-hop mixed RF/FSO/RF relay network consisting of $K_1$ sources on a first hop 117 $U_k$ (k=1, 2, . . . , $K_1$) (102, 103, 104), two un-coded type DF relays $R_i$ (i=1, 2) (105, 115) and $K_2$ destinations on a third hop 119 $D_j$ (j=1, 2, . . . , $K_2$) (112, 113, 114). The sources 110 are connected with a first relay 105 through RF links 117. The first relay 105 is connected with a second relay 115 via FSO link. The second relay 115 is connected with destinations 120 through RF links 119. The abovementioned communication modalities are non-limiting and are merely representative of a variety of communication modalities. The direct links between the sources and destinations are assumed to be in deep fade. Further, channel coefficients are held constant over an entire block of communication in accordance with a block fading model.

Communication is operated in a half-duplex mode and to be conducted over three phases outlined above and repeated here: selected user $U_{sel} \to R_1$, $R_1 \to R_2$, and $R_2 \to D_{sel}$. The received signal at $R_1$ 105 from the kth user can be expressed as $$y_{k,r_1} = \sqrt{P_k} h_{k,r_1} x_{k,r_1} + n_{r_1}, \quad (1)$$

where $P_k$ is the transmit power of the kth user, $h_{k,r_1}$ is the channel coefficient of the $U_k \to R_1$ link, $x_{k,r_1}$ is the transmitted symbol of $U_k$ with $\mathbb{E}\{|x_{k,r_1}|^2\}=1$, and $n_{r_1} \sim N(0, N_{01})$ is an additive white Gaussian noise (AWGN) term, where $\mathbb{E}\{\cdot\}$ is the mathematical expectation. Using (1), the SNR at $R_1$ 105 due to $U_k$ 104 can be written as $$\gamma_{U_k, R_1} = \frac{P_k}{N_{01}} |h_{k,r_1}|^2. \quad (2)$$

According to the generalized order user scheduling, the source with the $N_1^{th}$ best $\gamma_{U_k,R_1}$ or equivalently, the $N_1^{th}$ largest $|h_{k,r_1}|^2$ among the other sources 110 is selected to transmit its message to $R_1$ 105 in the first communication phase 117. In other words, the source 110 is selected such that $\gamma_{U_{Sel},R_1} = N_1^{th} \max\{\gamma_{U_k,R_1}\}$. Processing circuitry is configured to perform the selection process at $R_1$ according the selection scheme described herein. The subcarrier intensity modulation (SIM) scheme is employed at the relay $R_1$ 105, where a standard RF coherent/noncoherent modulator and demodulator can be used for transmitting and recovering the source data. At $R_1$ 105, after filtering by a bandpass filter (BPF), a direct current (DC) bias is added to the filtered RF signal to ensure that the optical signal is non-negative. Then, the biased signal is sent to a continuous wave laser driver. The retransmitted optical signal at $R_1$ 105 is written as $$y_{r_1}^{Opt} = \sqrt{P_{Opt}}(1 + \mathcal{M} y_{Sel,r_1}), \quad (3)$$

where $P_{Opt}$ denotes the average transmitted optical power and it is related to the relay electrical power $P_r$ by the electrical-to-optical conversion efficiency $\eta_1$ as $P_{Opt} = \eta_1 P_{r_1}$, where M denotes the modulation index and $\gamma_{Sel,r_1}$ is the RF received signal at $R_1$ 105 from the selected source (see article by Lee, E et al, "Performance analysis of the asymmetric dual-hop relay transmission with mixed RF/FSO links" published in IEEE Transactions on Information Theory, in 2004, and incorporated herein by reference). The optical signal at $R_2$ 115 received from $R_1$ 105 at the second phase of communication 118 can be expressed as $$y_{r_1,r_2} = g_{r_1,r_2} \{\sqrt{P_{Opt}}[1 + \mathcal{M}(\sqrt{P_{Sel}} h_{Sel,r_1} x_{Sel,r_1} + n_{r_1})]\} + n_{r_2}, \quad (4)$$

where $n_{r_2} \sim N(0, N_{O2})$ is an AWGN term at $R_2$ 115. Moreover, the channel coefficients of the $R_1 \to R_2$ link which is given by $g_{r_1,r_2}$ is modeled as $g_{r_1,r_2} = g_a g_f$, where $g_a$ and $g_f$ are the average gain and the fading gain of the FSO link, respectively, and are given by $$\begin{cases} g_a = \left[\text{erf}\left(\frac{\sqrt{\pi} q}{\sqrt{2} \phi d^{FSO}}\right)\right]^2 \times 10^{-\kappa d^{FSO}/10}, \\ g_f \sim G\text{Gamma}(\alpha, \beta), \end{cases} \quad (5)$$

where q is the aperture radius, $\phi$ is the divergence angle of the beam, $d^{FSO}$ is the distance between the FSO transmitter and receiver, $\kappa$ is the weather-dependent attenuation coefficient, and GGamma($\alpha$, $\beta$) represents a Gamma-Gamma random variable with parameters $\alpha$ and $\beta$ (see article by Zhang, W et al, "Soft-switching hybrid FSO/RF links using short-length raptor codes: design and implementation" published in IEEE Journal on Selected Areas in Communications, in 2009, and incorporated herein by reference). Assuming spherical wave propagation, the parameters $\alpha$ and $\beta$ in the Gamma-Gamma distribution, which represent the fading turbulence conditions, are related to the physical parameters as follows:

$$\alpha = \left[\exp\left\{\frac{0.49\vartheta^2}{[1 + 0.18\xi^2 + 0.56\vartheta^{12/5}]^{7/6}}\right\} - 1\right]^{-1}, \quad (6)$$

$$\beta = \left[\exp\left\{\frac{0.51\vartheta^2[1 + 0.69\vartheta^{12/5}]^{-5/6}}{[1 + 0.9\xi^2 + 0.62\xi^2\vartheta^{12/5}]^{5/6}}\right\} - 1\right]^{-1}, \quad (7)$$

where $\vartheta^2 = 0.5 C_n^2 \zeta^{7/6} (d^{FSO})^{11/6}$, $\xi^2 = \zeta q^2/d^{FSO}$, $\zeta = 2\pi/\lambda^{FSO}$ is the wavelength, and $C_n^2$ is the weather-dependent index of refraction structure parameter (see article by He, B et al, "Bit-interleaved coded modulation for hybrid RF/FSO systems" published in IEEE Transactions on Communications, in 2009, and incorporated herein by reference).

When the DC component is filtered out at $R_2$ 115 and an optical-to-electrical conversion is performed, assuming $\mathcal{M}=1$, the received signal can be expressed as follows:

$$y_{r_1,r_2} = g_{r_1,r_2} \sqrt{P_{Ele}} (\sqrt{P_{Sel}} h_{Sel,r_1} x_{Sel,r_2} + n_{r_1}) + n_{r_2}, \quad (8)$$

where $P_{Ele} = \eta_2 P_{Opt} = \eta_1 \eta_2 P_{r_1}$ is the electrical power received at $R_2$ 115 and $\eta_2$ is the optical-to-electrical conversion efficiency.

From (8), the SNR at $R_2$ 115 can be written as $$\gamma R_2 = \frac{\gamma U_{Sel}, R_1 \gamma R_1, R_2}{\gamma Sel, R_1 + \gamma R_1, R_2 + 1}, \quad (9)$$

where $$\gamma_{U_{Sel},R_1} = \frac{P_{Sel}}{N_{01}} |h_{Sel,r_1}|^2, \gamma_{R_1,R_2} = \frac{\eta_1 \eta_2 P_{r_1}}{N_{02}} |g_{r_1,r_2}|^2,$$

and $P_{r_1}$ is the transmit power at $R_1$ 105. The SNR in (9) can be rewritten using the standard approximation $\gamma_{R_2} \cong \min(\gamma_{U_{Sel},R_1}, \gamma_{R_1,R_2})$ (see article by Ansari, I S et al, "Impact of point errors on the performance of mixed RF/FSO dual-hop transmission systems" published in IEEE Wireless Communications Letters, in 2013 and an article by Ansari, I S et al, "On the performance of mixed RF/FSO variable gain dual-hop transmission systems with pointing errors", published at IEEE Vehicular Technology Conference, in 2013, and incorporated herein by reference) as $$\gamma R_2 = \frac{\gamma U_{Sel}, R_1 \gamma R_1, R_2}{\gamma U_{Sel}, R_1 + \gamma R_1, R_2 + 1}. \quad (10)$$

The signal received at $D_j$ 114 from $R_2$ 115 in the third phase of communication 119 can be written as $$y_{r_2,d_j} = \sqrt{P_{r_2}} h_{r_2,d_j} x_{d_j} + n_{d_j}, \quad (11)$$

where $P_{r_2}$ is the transmit power at $R_2$ 115, $h_{r_2,j}$ is the channel coefficient of the $R_2 \to D_j$ link, $x_{d_j}$ is the transmitted symbol of $d_j$ with $\mathbb{E}\{|x_{d_j}|^2\}=1$, and $n_{d_j} \sim N(0, N_{03})$ is an AWGN term. Using (11), the SNR at $D_j$ 114 can be written as $$\gamma_{R_2,D_j} = \frac{P_{r_2}}{N_{03}} |h_{r_2,j}|^2. \quad (12)$$

According to generalized order user scheduling, the destination 120 with the $N_2^{th}$ best $\gamma_{R_2,D_j}$ or equivalently, the $N_2^{th}$ largest $|h_{r_2,j}|^2$ among the other destinations 120 is selected to receive its message from $R_2$ 115 in the third communication phase 119. In other words, the destination is selected such that $\gamma_{R_2,D_{Sel}} = N_2^{th} \max\{\gamma_{R_2,D_j}\}$. Processing circuitry is configured to perform the selection process at $R_2$ according the selection scheme described herein.

The channel coefficients of the RF links 117, 119 $h_{k,r_1}$ ($k=1=\ldots=K_1$) and $h_{r_2,j}$ ($j=1=\ldots=K_2$) follow the Rayleigh fading model and, therefore, channel gains $|h_{k,r_1}|^2$ and $|h_{r_2,j}|^2$ are exponentially distributed random variables with mean powers $\Omega_{k,r_1}$ and $\Omega_{r_2,j}$, respectively. Therefore, the probability density functions (PDFs) of $\gamma_{U_k,R_1}$ and $\gamma_{R_2,D_j}$ are given by $$f_{\gamma_{U_k,R_1}}(\gamma) = \lambda_{k,r_1} \exp(-\lambda_{k,r_1}\gamma), \text{ where } \lambda_{k,r_1} = 1/\bar{\gamma}_{k,r_1} \text{ and}$$

$$\bar{\gamma}_{k,r_1} = \frac{P_k}{N_0} \mathbb{E}\{|h_{k,r_1}|^2\} = \frac{P_k}{N_{01}} \Omega_{k,r_1}, \text{ and by}$$

$$f_{\gamma_{R_2,D_j}}(\gamma) = \lambda_{r_2,j} \exp(-\lambda_{r_2,j}\gamma), \text{ where}$$

$$\lambda_{r_2,j} = 1/\bar{\gamma}_{r_2,j} \text{ and } \bar{\gamma}_{r_2,j} = \frac{P_k}{N_{03}} \mathbb{E}\{|h_{r_2,j}|^2\} = \frac{P_{r_2}}{N_{03}} \Omega_{r_2,j},$$

respectively. Regarding the second hop, it is assumed that the FSO link 118 experiences a unified Gamma-Gamma fading model including the pointing errors effect whose SNR PDF (see article by Ansari, I S et al, "Impact of point errors on the performance of mixed RF/FSO dual-hop transmission systems" published in IEEE Wireless Communications Letters, in 2013, and incorporated herein by reference), is given by $$f_{\gamma_{R_1,R_2}}(\gamma) = \frac{\zeta^2}{r\gamma\Gamma(\alpha)\Gamma(\beta)} G_{1,3}^{3,0}\left[\alpha\beta(\lambda_{r_1,r_2}\gamma)^{\frac{1}{r}} \left| \begin{array}{c} \zeta^2 + 1 \\ \zeta^2, \alpha, \beta \end{array}\right.\right], \quad (13)$$

$\zeta$ is the ratio between the equivalent beam radius at the receiver and the pointing error displacement standard deviation (jitter) at the receiver (i.e. when $\zeta \to \infty$, non-pointing error). r is the parameter defining the type of detection technique (i.e. r=1 represents heterodyne detection and r=2 represents intensity modulation (IM)/direct detection (DD)). α and β are the fading parameters related to the atmospheric turbulence conditions with lower values indicating severe atmospheric turbulence conditions. Γ(.) is the Gamma function, $$\lambda_{r_1,r_2} = 1/\bar{\gamma}_{r_1,r_2} \text{ where}$$

$$\bar{\gamma}_{r_1,r_2} = \frac{\eta_1 \eta_2 P_{r_1}}{N_{02}} \mathbb{E}\{|g_{r_1,r_2}|^2\} = \frac{\eta_1 \eta_2 P_{r_1}}{N_{02}} \mu_{r_1,r_2}$$

and G(.) is the Meijer G-function (see textbook by Gradshteyn, I S and Ryzhik, I M, "Tables of Integrals, Series and Products", published by Academic Press, in 2000, and incorporated herein by reference).

The end-to-end (e2e) SNR at the selected destination can be written using the standard approximation $\gamma_D \cong \min(\gamma_{R_2}, \gamma_{R_2,D_{Sel}})$ as $$\gamma_D = \frac{\gamma_{R_2} \gamma_{R_2,D_{Sel}}}{\gamma_{R_2} + \gamma_{R_2,D_{Sel}}}. \quad (14)$$

Figure 2:
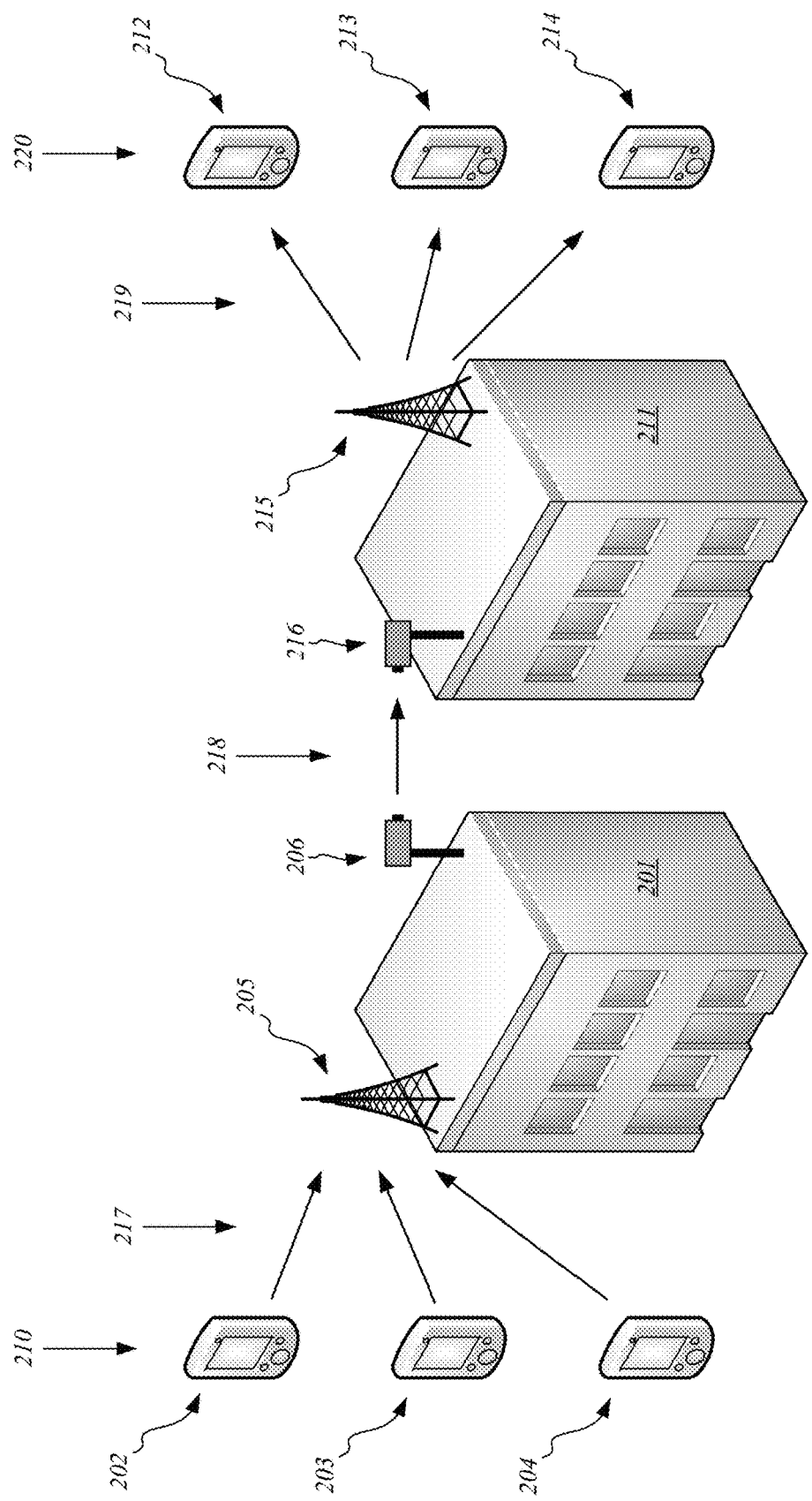
FIG. 2 is a schematic of a multiuser triple-hop mixed RF/FSO/RF relay network with generalized order user scheduling according to one or more aspects of the disclosed subject matter.

In an exemplary embodiment, as seen in FIG. 2, $K_1$ sources 210 are users of wireless devices. A user $U_{Sel}$ 204 is selected from a group of source users 210, as the user with the $N_1^{th}$ best SNR value, to transmit its signal to a first relay 201. The signal is transmitted via RF link on a first hop 217. Each source user ($U_1$ 202, $U_2$ 203, . . . , $U_{K_1}$ 204) is equipped with a single antenna. The first relay 201 is equipped with a single antenna 205 and a single photo-aperture transmitter 206. A second relay 211 is equipped with a single antenna 215 and a photo-aperture transmitter 216. Deploying a DF scheme, the first relay 201, with support from processing circuitry configured to decode a transmitted signal, receives the signal from the user $U_{Sel}$ 204 and transmits the signal to a second relay 211 on a second hop 218 via FSO link. The second relay 211 receives the signal from the first relay 201 and, deploying a DF scheme, with support from processing circuitry configured to decode the transmitted signal, transmits the signal to a destination user $D_{Sel}$ 214 via RF link on a third hop 219. The destination user $D_{Sel}$ 214 is selected from a group of destination users 220, as the user with the $N_2^{th}$ best SNR value, to receive its signal from the second relay 211. Each destination user ($D_1$ 212, $D_2$ 213, . . . , $D_{K_2}$ 214) is equipped with a single antenna.

System Performance Metrics (Analytical Solutions)

To evaluate system performance, the statistics of the e2e SNR provided in (14) must be determined.

To this end, the outage probability is defined as the probability that the SNR at a selected destination drops below a predetermined outage threshold $\gamma_{out}$, or $P_{out} = \Pr[\gamma_d \leq \gamma_{out}]$, where Pr[.] is the probability operation and $\gamma_{out}$ is a predetermined outage threshold. The outage probability can be obtained from the cumulative distribution function (CDF) of the e2e SNR as $P_{out} = F_{\gamma_D}(\gamma_{out})$. This CDF can be written in terms of CDFs of the three hops' SNRS as $$F_{\gamma_D}(\gamma) = \quad (15)$$

$$1 - \{(1 - F_{\gamma_{U_{Sel},R_1}}(\gamma))(1 - F_{\gamma_{R_1,R_2}}(\gamma)) \times (1 - F_{\gamma_{R_2,D_{Sel}}}(\gamma))\},$$

where $F_{\gamma_{U_{Sel},R_1}}(\gamma), F_{\gamma_{R_1,R_2}}(\gamma), F_{\gamma_{R_2,D_{Sel}}}(\gamma)$ are the CDFs of the first hop, second hop, and third hop SNRs, respectively.

The CDF of the first hop begins from the PDF according to generalized order user selection, wherein the PDF represents the $N_1^{th}$ best SNR or, the source of the $N_1^{th}$ best SNR as selected by the first relay. The CDF is rewritten as $$F_{\gamma_{U_{Sel},R_1}}(\gamma) = \quad (19)$$

$$K_1 \binom{K_1 - 1}{N_1 - 1} \sum_{k=0}^{K_1 - N_1} \frac{\binom{K_1 - N_1}{k}(-1)^k}{(k + N_1)} \times [1 - \exp(-(k + N_1)\lambda_{u,r_1}\gamma)].$$

where the users on the third hop have been assumed to have independent identical distributed channels.

The CDF of the second hop is determined from the PDF of the FSO link incorporating the Gamma-Gamma fading model and including point errors. The CDF is rewritten as $$F_{\gamma_{R_1,R_2}}(\gamma) = A G_{r+1,3r+1}^{3r,1}\left[\frac{B}{\bar{\gamma}_{r_1,r_2}}\gamma \, \middle| \, \begin{array}{c} 1, \chi_1 \\ \chi_2, 0 \end{array}\right], \text{ where} \quad (20)$$

$$A = \frac{r^{\alpha+\beta-2}\zeta^2}{(2\pi)^{r-1}\Gamma(\alpha)\Gamma(\beta)}, \quad B = \frac{(\alpha\beta)^r}{r^{2r}},$$

$$\chi_1 = \frac{\zeta^2+1}{r}, \ldots, \frac{\zeta^2+r}{r},$$

comprises of r terms and $$\chi_2 = \frac{\zeta^2}{r}, \ldots, \frac{\zeta^2+r-1}{r}, \frac{\alpha}{r}, \ldots, \frac{\alpha+r-1}{r}, \frac{\beta}{r}, \ldots,$$

$$\frac{\beta+r-1}{r}$$

comprises of 3r terms.

Similar to the first hop, the CDF of the third hop begins from the PDF according to generalized order user selection, wherein the PDF represents the $N_2^{th}$ best SNR or, the destination of the $N_2^{th}$ best SNR as selected by the second relay. The CDF is rewritten as $$F_{\gamma_{R_2,D_{Sel}}}(\gamma) = \quad (22)$$

$$K_2 \binom{K_2 - 1}{N_2 - 1} \sum_{j=0}^{K_2 - N_2} \frac{\binom{K_2 - N_2}{j}(-1)^j}{(j + N_2)} \times [1 - \exp(-(j + N_2)\lambda_{r_2,u}\gamma)],$$

where the users on the third hop have been assumed to have independent identical distributed channels.

Following the substitution of the CDFs from each hop ((19), (20), (22)) into (15), the full e2e CDF can be written as $$F_{\gamma_D}(\gamma) = \binom{K_1-1}{N_1-1}K_1 \sum_{k=0}^{K_1-N_1} \frac{\binom{K_1-N_1}{k}(-1)^k}{(k+N_1)} \left\{1 - \exp(\tau_1\gamma) - \right. \qquad (23)$$

$$A \times \left(G_{r+1,3r+1}^{3r,1}\left[\delta_0\gamma \,\middle|\, \begin{matrix} 1, \chi_1 \\ \chi_2, 0 \end{matrix}\right][1-\exp(-\tau_1\gamma)]\right)\right\} +$$

$$\binom{K_2-1}{N_2-1}K_2 \sum_{j=0}^{K_2-N_2} \frac{\binom{K_2-N_2}{j}(-1)^j}{(j+N_2)} \left\{1 - \exp(-\tau_2\gamma) - \right.$$

$$A\left(G_{r+1,3r+1}^{3r,1}\left[\delta_0\gamma \,\middle|\, \begin{matrix} 1, \chi_1 \\ \chi_2, 0 \end{matrix}\right][1-\exp(-\tau_2\gamma)]\right)\right\} -$$

$$\binom{K_1-1}{N_1-1}K_1 \sum_{k=0}^{K_1-N_1} \frac{\binom{K_1-N_1}{k}(-1)^k}{(k+N_1)} \binom{K_2-1}{N_2-1}K_2 \times$$

$$\sum_{j=0}^{K_2-N_2} \frac{\binom{K_2-N_2}{j}(-1)^j}{(j+N_2)} \left\{1 - \exp(-\tau_1\gamma) - \exp(-\tau_2\gamma) + \right.$$

$$\exp(-[\tau_1+\tau_2]\gamma) - A\left(G_{r+1,3r+1}^{3r,1}\left[\delta_0\gamma \,\middle|\, \begin{matrix} 1, \chi_1 \\ \chi_2, 0 \end{matrix}\right] \times [\right.$$

$$\left. 1 - \exp(-\tau_1\gamma) - \exp(-\tau_2\gamma) + \exp(-[\tau_1+\tau_2]\gamma)]\right)\right\} +$$

$$AG_{r+1,3r+1}^{3r,1}\left[\delta_0\gamma \,\middle|\, \begin{matrix} 1, \chi_1 \\ \chi_2, 0 \end{matrix}\right],$$

where $\tau_1 = (k+N_1)\lambda_{u,r_1}$, $\delta_0 = \dfrac{B}{\bar{\gamma}_{r_1,r_2}}$, and $\tau_2 = (j+N_2)\lambda_{r_2,u}$.

The CDF in (23) is used to determine several performance measures as closed-form expressions.

To determine the exact average symbol error probability (ASEP), the ASEP is expressed in terms of the CDF of $\gamma_D$ as $$ASEP = \frac{a\sqrt{b}}{2\sqrt{\pi}} \int_0^\infty \frac{\exp(-b\gamma)}{\sqrt{\gamma}} F_{\gamma_D}(\gamma) d\gamma, \qquad (24)$$

where a and b are modulation-specific parameters (see article by McKay, M R et al, "Performance analysis of MIMO-MRC in double-correlated Rayleigh environments", published in IEEE Transactions on Communications, in 2007, incorporated herein by reference). A SIM scheme is adopted, allowing known digital modulation techniques such as phase shift keying to be used. Therefore, the error probability computing method, used for RF wireless communication systems, can be used to evaluate the error probability performance in FSO systems. Upon combination of equations, ASEP can be written as $$ASEP = \qquad (25)$$

$$\frac{a\sqrt{b}}{2\sqrt{\pi}} \left\{ \binom{K_1-1}{N_1-1}K_1 \sum_{k=0}^{K_1-N_1} \frac{\binom{K_1-N_1}{k}(-1)^k}{(k+N_1)} \left(\frac{\Gamma(1/2)}{b^{\frac{1}{2}}} - \frac{\Gamma(1/2)}{(b+\tau_1)^{\frac{1}{2}}} - \right.\right.$$

$$A\left[b^{-\frac{1}{2}}G_{r+2,3r+1}^{3r,2}\left[\frac{\delta_0}{b} \,\middle|\, \begin{matrix} \frac{1}{2}, 1, \chi_1 \\ \chi_2, 0 \end{matrix}\right] - \right.$$

$$\left.(b+\tau_1)^{-\frac{1}{2}}G_{r+2,3r+1}^{3r,2}\left[\frac{\delta_1}{(b+\tau_1)} \,\middle|\, \begin{matrix} \frac{1}{2}, 1, \chi_1 \\ \chi_2, 0 \end{matrix}\right]\right]\right) +$$

$$\binom{K_2-1}{N_2-1} \times K_2 \sum_{j=0}^{K_2-N_2} \frac{\binom{K_2-N_2}{j}(-1)^j}{(j+N_2)} \left(\frac{\Gamma(1/2)}{b^{\frac{1}{2}}} - \right.$$

$$\frac{\Gamma(1/2)}{(b+\tau_2)^{\frac{1}{2}}} - A\left[b^{-\frac{1}{2}}G_{r+2,3r+1}^{3r,2}\left[\frac{\delta_0}{b} \,\middle|\, \begin{matrix} \frac{1}{2}, 1, \chi_1 \\ \chi_2, 0 \end{matrix}\right] - \right.$$

$$\left.(b+\tau_2)^{-\frac{1}{2}}G_{r+2,3r+1}^{3r,2} \times \left[\frac{\delta_0}{(b+\tau_2)} \,\middle|\, \begin{matrix} \frac{1}{2}, 1, \chi_1 \\ \chi_2, 0 \end{matrix}\right]\right]\right) -$$

$$\binom{K_1-1}{N_1-1}K_1 \sum_{k=0}^{K_1-N_1} \frac{\binom{K_1-N_1}{k}}{(k+N_1)} \times (-1)^k \binom{K_2-1}{N_2-1}K_2$$

$$\sum_{j=0}^{K_2-N_2} \frac{\binom{K_2-N_2}{j}(-1)^j}{(j+N_2)} \left(\frac{\Gamma(1/2)}{b^{\frac{1}{2}}} - \frac{\Gamma(1/2)}{(b+\tau_1)^{\frac{1}{2}}} - \right.$$

$$\frac{\Gamma(1/2)}{(b+\tau_2)^{\frac{1}{2}}} + \frac{\Gamma(1/2)}{(b+\tau_1+\tau_2)^{\frac{1}{2}}} -$$

$$A\left[b^{-\frac{1}{2}} \times G_{r+2,3r+1}^{3r,2}\left[\frac{\delta_0}{b} \,\middle|\, \begin{matrix} \frac{1}{2}, 1, \chi_1 \\ \chi_2, 0 \end{matrix}\right] - (b+\tau_1)^{-\frac{1}{2}}\right.$$

$$G_{r+2,3r+1}^{3r,2} \times \left[\frac{\delta_0}{(b+\tau_1)} \,\middle|\, \begin{matrix} \frac{1}{2}, 1, \chi_1 \\ \chi_2, 0 \end{matrix}\right] -$$

$$G_{r+2,3r+1}^{3r,2}\left[\frac{\delta_0}{(b+\tau_2)} \,\middle|\, \begin{matrix} \frac{1}{2}, 1, \chi_1 \\ \chi_2, 0 \end{matrix}\right] \times$$

$$(b \times \tau_2)^{-\frac{1}{2}} + G_{r+2,3r+1}^{3r,2}\left[\frac{\delta_0}{(b+\tau_1+\tau_2)} \,\middle|\,\right.$$

$$\left.\left.\begin{matrix} \frac{1}{2}, 1, \chi_1 \\ \chi_2, 0 \end{matrix}\right] \times (b+\tau_1+\tau_2)^{-\frac{1}{2}}\right]\right) +$$

$$\left.Ab^{-\frac{1}{2}}G_{r+2,3r+1}^{3r,2}\left[\frac{\delta_0}{b} \,\middle|\, \begin{matrix} \frac{1}{2}, 1, \chi_1 \\ \chi_2, 0 \end{matrix}\right]\right\}.$$

Because the coherence time of the FSO fading channel is in the order of milliseconds, a single fade can obliterate millions of bits at gigabits/second data rates. Therefore, the exact average (i.e., ergodic) channel capacity represents the best achievable capacity of an optical wireless link. Using a PDF-based method, the ergodic capacity can be expressed in terms of the PDF of $\gamma_D$ as $$C = \frac{1}{\ln(2)} \int_0^\infty \ln(1+\gamma) f_{\gamma_D}(\gamma) d\gamma. \tag{26}$$

Following multiple derivations and integrations described in detail in the cited references, the exact ergodic capacity can be written as $$C = \frac{1}{\ln(2)} \Bigg\{ \binom{K_1-1}{N_1-1} K_1 \sum_{k=0}^{K_1-N_1} \frac{\binom{K_1-N_1}{k}(-1)^k}{\tau_1} \Big(-\exp(\tau_1) E_i(-\tau_1) - \tag{36}$$

$$A \Bigg\{ \frac{1}{\delta_0} \Big[ G_{r+2,3r+2}^{3r+2,1} \Big[ \delta_0 \Big| \begin{matrix} 0,1,\chi_1 \\ \chi_2, 0 \end{matrix} \Big] - G_{1,0:2,2:r,3r}^{0,1:1,2:3r,0} \times \Big[ \frac{1}{\tau_1}, $$

$$\delta_0 \tau_1 \Big| \begin{matrix} 1 \\ - \end{matrix} \Big| \begin{matrix} 1,1 \\ 1,0 \end{matrix} \Big| \begin{matrix} \chi_1 \\ \chi_2 \end{matrix} \Big] \Big] G_{1,0:2,2:r+1,3r+1}^{0,1:1,2:3r,1} \times$$

$$\Big[ \frac{1}{\tau_1}, \delta_0 \tau_1 \Big| \begin{matrix} 2 \\ - \end{matrix} \Big| \begin{matrix} 1,1 \\ 1,0 \end{matrix} \Big| \begin{matrix} 1, \chi_1 \\ \chi_2, 0 \end{matrix} \Big] \times (\tau_1)^2 \Bigg\} \Bigg) +$$

$$\binom{K_2-1}{N_2-1} K_2 \times \sum_{j=0}^{K_2-N_2} \binom{K_2-N_2}{j} (-1)^j (\tau_2)^{-1}$$

$$(-\exp(\tau_2) E_i(-\tau_2) - A \Bigg\{ \frac{1}{\delta_0} \Big[ G_{r+2,3r+2}^{3r+2,1}$$

$$\Big[ \delta_0 \Big| \begin{matrix} 0,1,\chi_1 \\ \chi_2, 0 \end{matrix} \Big] - G_{1,0:2,2:r,3r}^{0,1:1,2:3r,0} \times$$

$$\Big[ \frac{1}{\tau_2}, \delta_0 \tau_2 \Big| \begin{matrix} 1 \\ - \end{matrix} \Big| \begin{matrix} 1,1 \\ 1,0 \end{matrix} \Big| \begin{matrix} \chi_1 \\ \chi_2 \end{matrix} \Big] \Big] +$$

$$(\tau_2)^2 G_{1,0:2,2:r+1,3r+1}^{0,1:1,2:3r,1} \times \Big[ \frac{1}{\tau_2}, \delta_0 \tau_2 \Big|$$

$$\begin{matrix} 2 \\ - \end{matrix} \Big| \begin{matrix} 1,1 \\ 1,0 \end{matrix} \Big| \begin{matrix} 1, \chi_1 \\ \chi_2, 0 \end{matrix} \Big] \Bigg\} \Bigg) - \binom{K_1-1}{N_1-1}$$

$$K_1 \times \sum_{k=0}^{K_1-N_1} \frac{\binom{K_1-N_1}{k}(-1)^k}{\tau_1}$$

$$\binom{K_2-1}{N_2-1} K_2 \sum_{j=0}^{K_2-N_2} (-1)^j$$

$$\frac{\binom{K_2-N_2}{j}}{\tau_2} \times (-\exp(\tau_1)$$

$$E_i(-\tau_1) - \exp(\tau_2) E_i(-\tau_2) +$$

$$\exp(\tau_1 + \tau_2) \times E_i(-(\tau_1 + \tau_2)) -$$

$$A \Bigg\{ \frac{1}{\delta_0} \Big[ G_{r+2,3r+2}^{3r+2,1} \Big[ \delta_0 \Big| \begin{matrix} 0,1,\chi_1 \\ \chi_2, 0 \end{matrix} \Big] -$$

$$G_{1,0:2,2:r,3r}^{0,1:1,2:3r,0} \times \Big[ \frac{1}{\tau_1}, \delta_0 \tau_1 \Big| \begin{matrix} 1 \\ - \end{matrix} \Big| \begin{matrix} 1,1 \\ 1,0 \end{matrix}$$

$$\Big| \begin{matrix} \chi_1 \\ \chi_2 \end{matrix} \Big] - G_{1,0:2,2:r,3r}^{0,1:1,2:3r,0} \Big[ \frac{1}{\tau_2}, \delta_0 \tau_2 \Big| \begin{matrix} 1 \\ - \end{matrix} \Big|$$

$$\begin{matrix} 1,1 \\ 1,0 \end{matrix} \Big| \begin{matrix} \chi_1 \\ \chi_2 \end{matrix} \Big] + G_{1,0:2,2:r,3r}^{0,1:1,2:3r,0} \Big[ \frac{1}{[\tau_1+\tau_2]} \Big],$$

$$\delta_0[\tau_1+\tau_2] \Big| \begin{matrix} 1 \\ - \end{matrix} \Big| \begin{matrix} 1,1 \\ 1,0 \end{matrix} \Big| \begin{matrix} \chi_1 \\ \chi_2 \end{matrix} \Big] \Big] +$$

$$(\tau_1)^2 \times G_{1,0:2,2:r+1,3r+1}^{0,1:1,2:3r,1}$$

$$\Big[ \frac{1}{\tau_1}, \delta_0 \tau_1 \Big| \begin{matrix} 2 \\ - \end{matrix} \Big| \begin{matrix} 1,1 \\ 1,0 \end{matrix} \Big| \begin{matrix} 1, \chi_1 \\ \chi_2, 0 \end{matrix} \Big] +$$

$$(\tau_2)^2 G_{1,0:2,2:r+1,3r+1}^{0,1:1,2:3r,1} \Big[ \frac{1}{\tau_2},$$

$$\delta_0 \tau_2 \Big| \begin{matrix} 2 \\ - \end{matrix} \Big| \begin{matrix} 1,1 \\ 1,0 \end{matrix} \Big| \begin{matrix} 1, \chi_1 \\ \chi_2, 0 \end{matrix} \Big] -$$

$$[\tau_1+\tau_2]^2 \times G_{1,0:2,2:r,3r}^{0,1:1,2:3r,0} \Big[ \frac{1}{[\tau_1+\tau_2]},$$

$$\delta_0[\tau_1+\tau_2] \Big| \begin{matrix} 1 \\ - \end{matrix} \Big| \begin{matrix} 1,1 \\ 1,0 \end{matrix} \Big| \begin{matrix} \chi_1 \\ \chi_2 \end{matrix} \Big] +$$

$$\frac{1}{\delta_0} G_{r+2,3r+2}^{3r+2,1} \Big[ \delta_0 \Big| \begin{matrix} 0,1,\chi_1 \\ \chi_2, 0 \end{matrix} \Big] \Bigg\},$$

where $E_i(.)$ is an exponential integral function, and $G[Z_1, Z_2|.|.|.]$ is the extended generalized bivariate Meijer G-function.

System Performance Metrics (Asymptotic Solutions)

Due to the complexity of the above expressions, approximations of these expressions are required to appropriately evaluate the impact of changes in performance parameters and gain system insight. Detailed derivation of the approximate solutions can be found in the cited references.

The asymptotic outage probability can be written at the high SNR regime as $P_{out} \cong (G_c SNR)^{-G_d}$, where $G_c$ and $G_d$ are the coding gain and diversity order of the system, respectively (see textbook by Simon, M K and Alouini, M-S, "Digital Communication over Fading Channels", published by John Wiley & Sons, Inc., in 2005, and incorporated herein by reference). $G_c$ represents a horizontal shift in the outage probability and $G_d$ refers to a change in the slope of the outage probability vs. SNR curve.

Consider the case of identical sources' channels ($\lambda_{1,r_1} = \lambda_{2,r_1} = \ldots = \lambda_{K_1,r_1} = \lambda_{u,r_1}$) and identical destinations' channels ($\lambda_{r_1,1} = \lambda_{r_1,2} = \ldots = \lambda_{r_2,K_2} = \lambda_{r_2,u}$). The approximate CDF of each hop separately is determined to calculate the approximate CDF of the e2e SNR.

Regarding the first hop link, using a Taylor series representation of the exponential term in the CDF to simplify and integrate, the CDF is written as $$F_{\gamma_{U_{Sel},R_1}}(\gamma) \simeq \binom{K_1-1}{N_1-1} K_1 (\lambda_{u,r_1})^{K_1-N_1+1} \frac{\gamma^{K_1-N_1+1}}{(K_1-N_1+1)}. \tag{38}$$

Regarding the second hop link, the CDF is written as $$F_{\gamma_{R_1,R_2}}(\gamma) \simeq \Upsilon \left(\frac{\gamma}{\bar{\gamma}_{r_1,r_2}}\right)^{\frac{\nu}{r}}, \tag{40}$$

where $\gamma$ is constant and is written as $$\Upsilon = A \sum_{k=1}^{6} \frac{\prod_{j=1,j\neq k}^{6} \Gamma(b_j - b_k)\Gamma(b_k)}{\prod_{j=2}^{3} \Gamma(a_j - b_k)\Gamma(1+b_k)} B^{b_k/2}, \tag{43}$$

The third hop link, similar to the first hop link, is simplified as $$F_{\gamma_{R_2,D_{Sel}}}(\gamma) \simeq \binom{K_2-1}{N_2-1} K_2(\lambda_{r_2,u})^{K_2-N_2+1} \frac{\gamma^{K_2-N_2+1}}{(K_2-N_2+1)}. \quad (45)$$

To obtain the diversity order and coding gain of the system, the CDF of (16) can be simplified, at high SNR values, to be $$F_{\gamma D}(\gamma) \cong F_{\gamma U_{Sel},R_1}(\gamma) + F_{\gamma R_1,R_2}(\gamma) + F_{\gamma R_2,D_{Sel}}(\gamma), \quad (46)$$

Substituting values into (46), the approximate outage probability, at high SNR values, can be written as $$P_{out}^{\infty} = \binom{K_1-1}{N_1-1} K_1(\bar{\gamma}_{u,r_1})^{-(K_1-N_1+1)} \frac{(\gamma_{out})^{K_1-N_1+1}}{(K_1-N_1+1)} + \quad (47)$$

$$\left(\frac{\Upsilon^{-\frac{r}{\nu}}}{\gamma_{out}} \bar{\gamma}_{r_1,r_2}\right)^{-\frac{\nu}{r}} + \binom{K_2-1}{N_2-1} K_2(\bar{\gamma}_{r_2,u})^{-(K_2-N_2+1)} \times \frac{(\gamma_{out})^{K_2-N_2+1}}{(K_2-N_2+1)}.$$

From (47), it is observed that the performance of the considered relay network will be dominated by the worst link among the available three links (first RF link, FSO link, second RF link). This domination depends on the parameters of these links. Therefore, the diversity order of the triple-hop mixed RF/FSO/RF relay network with generalized order user scheduling is equal to $\min(K_1-N_1+1, \nu/r, K_2-N_2+1)$. Based on the value of the diversity order, one of the following three cases represents the overall system performance.

Case 1 One hop is dominant, and the coding gain is written as $$G_c = \begin{cases} \left[\binom{K_1-1}{N_1-1} K_1 \frac{(\gamma_{out})^{K_1-N_1+1}}{(K_1-N_1+1)}\right]^{-\frac{1}{K_1-N_1+1}}, & G_d = K_1 - N_1 + 1, \\ \frac{\Upsilon^{-\frac{r}{\nu}}}{\gamma_{out}}, & G_d = \frac{\nu}{r}, \\ \left[\binom{K_2-1}{N_2-1} K_2 \frac{(\gamma_{out})^{K_2-N_2+1}}{(K_2-N_2+1)}\right]^{-\frac{1}{K_2-N_2+1}}, & G_d = K_2 - N_2 + 1 \end{cases} \quad (48)$$

Case 2 Two hops are dominant, and the coding gain is written as $$G_c = \begin{cases} \frac{1}{2}\left\{\left[\binom{K_1-1}{N_1-1} K_1 \frac{(\gamma_{out})^{K_1-N_1+1}}{(K_1-N_1+1)}\right]^{-\frac{1}{K_1-N_1+1}} + \right. \\ \left.\left[\binom{K_2-1}{N_2-1} K_2 \frac{(\gamma_{out})^{K_2-N_2+1}}{(K_2-N_2+1)}\right]^{-\frac{1}{K_2-N_2+1}}\right\}, & G_d = K_1 - N_1 + 1 = K_2 - N_2 + 1, \\ \frac{1}{2}\left\{\left[\binom{K_1-1}{N_1-1} K_1 \frac{(\gamma_{out})^{K_1-N_1+1}}{(K_1-N_1+1)}\right]^{-\frac{1}{K_1-N_1+1}} + \frac{\Upsilon^{-\frac{r}{\nu}}}{\gamma_{out}}\right\}, & G_d = K_1 - N_1 + 1 = \frac{\nu}{r}, \\ \frac{1}{2}\left\{\left[\binom{K_2-1}{N_2-1} K_2 \frac{(\gamma_{out})^{K_2-N_2+1}}{(K_2-N_2+1)}\right]^{-\frac{1}{K_2-N_2+1}} + \frac{\Upsilon^{-\frac{r}{\nu}}}{\gamma_{out}}\right\}, & G_d = K_2 - N_1 + 1 = \frac{\nu}{r}, \end{cases} \quad (49)$$

Case 3 Three hops have the same diversity order, and so the coding gain is written as $$G_c = \begin{cases} \frac{1}{3}\left\{\left[\binom{K_1-1}{N_1-1} K_1 \frac{(\gamma_{out})^{K_1-N_1+1}}{(K_1-N_1+1)}\right]^{-\frac{1}{K_1-N_1+1}} + \right. \\ \left.\frac{\Upsilon^{-\frac{r}{\nu}}}{\gamma_{out}} + \left[\binom{K_2-1}{N_2-1} K_2 \frac{(\gamma_{out})^{K_2-N_2+1}}{-(K_2-N_2+1)}\right]^{-\frac{1}{K_2-N_2+1}}\right\}, \end{cases} \quad \begin{array}{l} G_d = K_1 - N_1 + \\ 1 = K_2 - N_2 + \\ 1 = \frac{\nu}{r}, \end{array} \quad (50)$$

System performance, dominated by the weakest link, can be described as: (1) the first hop link (i.e., $K_1$ and $N_1$), (2) the second hop link (i.e., $\zeta^2$, $\alpha$, $\beta$), and (3) the third hop link (i.e., $K_2$ and $N_2$). If the diversity orders of two hops are equal and are the minimum, the coding gain of the system equals the average of the coding gains across these two hops. Similarly, if the diversity orders of all three hops are equal, the coding gain of the system equals an average of the coding gains across the three hops.

The above approximate solutions are further used to determine the optimum adaptive power allocation for the transmitting nodes in the system.

The distance between the first hop $K_1$ sources and relay $R_1$ is defined as $d_{s,r_1}$, the distance between the relays $R_1$ and $R_2$ is defined as $d_{r_1,r_2}$, and the distance between relay $R_2$ and the third hop $K_2$ destinations is defined as $d_{r_2,d}$. The distance from $K_1$ sources to $K_2$ destinations, therefore, is defined as $D_{tot} = d_{s,r_1} + d_{r_1,r_2} + d_{r_2,d}$. Under a scenario where received power decays with distance, the average value of SNR in the hop between $K_1$ sources and relay $R_1$ is expressed as $$\bar{\gamma}_{s,r_1} = P_{s,r_1} d_{s,r_1}^{-\mu}, \text{ where } P_{rs,2} = \frac{P_{\mu,r_1}}{K_1} = \frac{E_{s,r_1}}{N_0},$$

$\mu$ is the path loss exponent and is equal for all hops to a value greater than 1, and $N_0$ is AWGN power (assumed equal for all hops). Similarly, average value of SNR in the second hop can be expressed as $\bar{\gamma}_{r_1,r_2} = P_{r_1,r_2} d_{r_1,r_2}^{-\mu}$, where $$P_{r_1,r_2} = \frac{E_{r_1,r_2}}{N_0}.$$

The average value of SNR in the third hop, between the relay $R_2$ and destinations $K_2$, is expressed as $$P_{r_2,d} = \frac{P_{r_2,d}}{K_1} = \frac{E_{r_2,d}}{K_0}.$$

The power constraint in this system can, therefore, be written as $P_{tot}=P_{s,r_1}+P_{r_1,r_2}+P_{r_2,d}$.

The optimal power allocation, minimizing outage probability as a function of the power constraint, is expressed as $$\left(P^*_{s,r_1}, P^*_{r_1,r_2}, P^*_{r_2,d}\right) = \arg\min_{(P_{s,r_1}, P_{r_1,r_2}, P_{r_2,d})} F_{\gamma D}(\gamma_{out}), \quad (51)$$

The asymptotic expression for $F_{\gamma D}(\gamma_{out})$ can be rewritten as $$F_{\gamma D}(\gamma_{out}) \simeq \qquad (52)$$
$$\binom{K_1-1}{N_1-1} K_1 \left(\frac{d^\mu_{s,r_1}}{P_{s,r_1}}\right)^{K_1-N_1+1} \frac{(\gamma_{out})^{K_1-N_1+1}}{(K_1-N_1+1)} + \frac{\gamma_{out} A B d^\mu_{r_1,r_2}}{P_{r_1,r_2}} +$$
$$\binom{K_2-1}{N_2-1} K_2 \times \left(\frac{d^\mu_{r_2,d}}{P_{r_2,d}}\right)^{K_2-N_2+1} \frac{(\gamma_{out})^{K_2-N_2+1}}{(K_2-N_2+1)}.$$

Using a Lagrangian multipliers method, differentiating, and simplifying to solve for $P_{s,r_1}^*$, $P_{r_1,r_2}^*$, and $P_{r_2,d}^*$, the following expressions are achieved for the optimum transmission powers at each hop:

$$P^*_{s,r_1} = \frac{d^\mu_{s,r_1}\gamma_{out} P_{tot}}{\gamma_{out}(d^\mu_{s,r_1}+d^\mu_{r_2,d}) + [ABd^\mu_{r_1,r_2}\gamma_{out}]^{\frac{1}{2}}}, \qquad (62)$$

$$P^*_{r_1,r_2} = \frac{[ABd^\mu_{r_1,r_2}\gamma_{out}]^{\frac{1}{2}} P_{tot}}{\gamma_{out}(d^\mu_{s,r_1}+d^\mu_{r_2,d}) + [ABd^\mu_{r_1,r_2}\gamma_{out}]^{\frac{1}{2}}}, \qquad (63)$$

$$P^*_{r_2,d} = \frac{d^\mu_{r_2,d}\gamma_{out} P_{tot}}{\gamma_{out}(d^\mu_{s,r_1}+d^\mu_{r_2,d}) + [ABd^\mu_{r_2,d}\gamma_{out}]^{\frac{1}{2}}}. \qquad (64)$$

System Evaluation

The accuracy of analytical and asymptotic solutions can be validated via comparison to Monte Carlo simulations.

Figure 3:
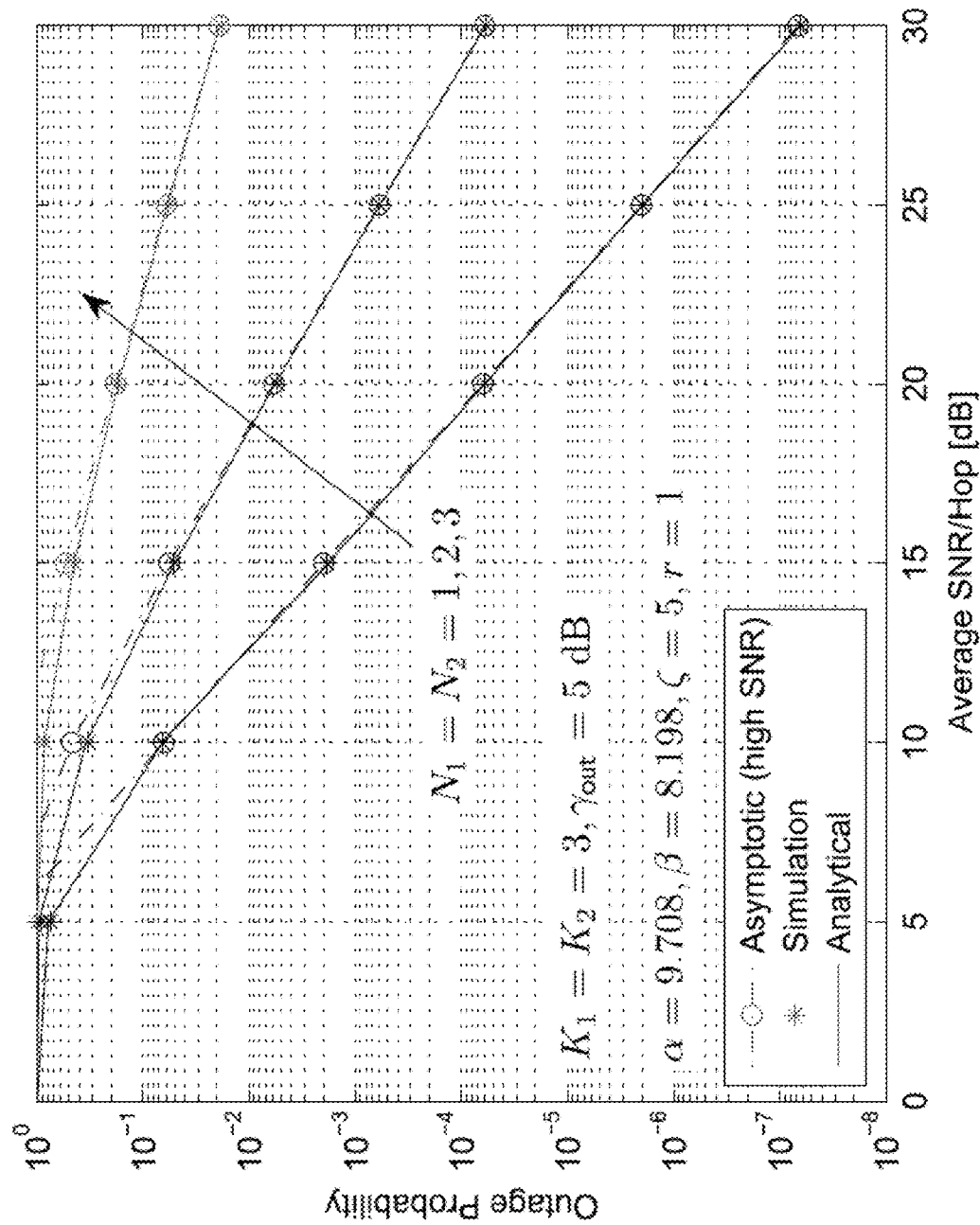
FIG. 3 is a graphical representation of system outage probability versus SNR of a multiuser mixed RF/FSO/RF relay network with generalized order user scheduling for different values of $N_1=N_2$ according to one or more aspects of the disclosed subject matter.

FIG. 3 is a graphical representation of the impact of the order of selected source at the first hop ($N_1$) and order of selected destination at the third hop ($N_2$) on outage probability of the system when $N_1=N_2$. FIG. 3 demonstrates that under weak turbulence conditions ($\alpha=9.708$ and $\beta=8.198$), or as $N_1=N_2$ decreases (the quality of the selected source and destination is improved), overall system performance is improved. Under weak turbulence, the RF links in the first and third hop drive system performance, and therefore improvements in SNR at those links dramatically improves system performance. In other words, the diversity order of the system is equal to $K_1-N_1+1=K_2-N_2+1$. For a fixed number of sources and destinations ($K_1=K_2$), reducing $N_t=N_2$ increases the diversity order of the system and enhances system performance.

Figure 4:
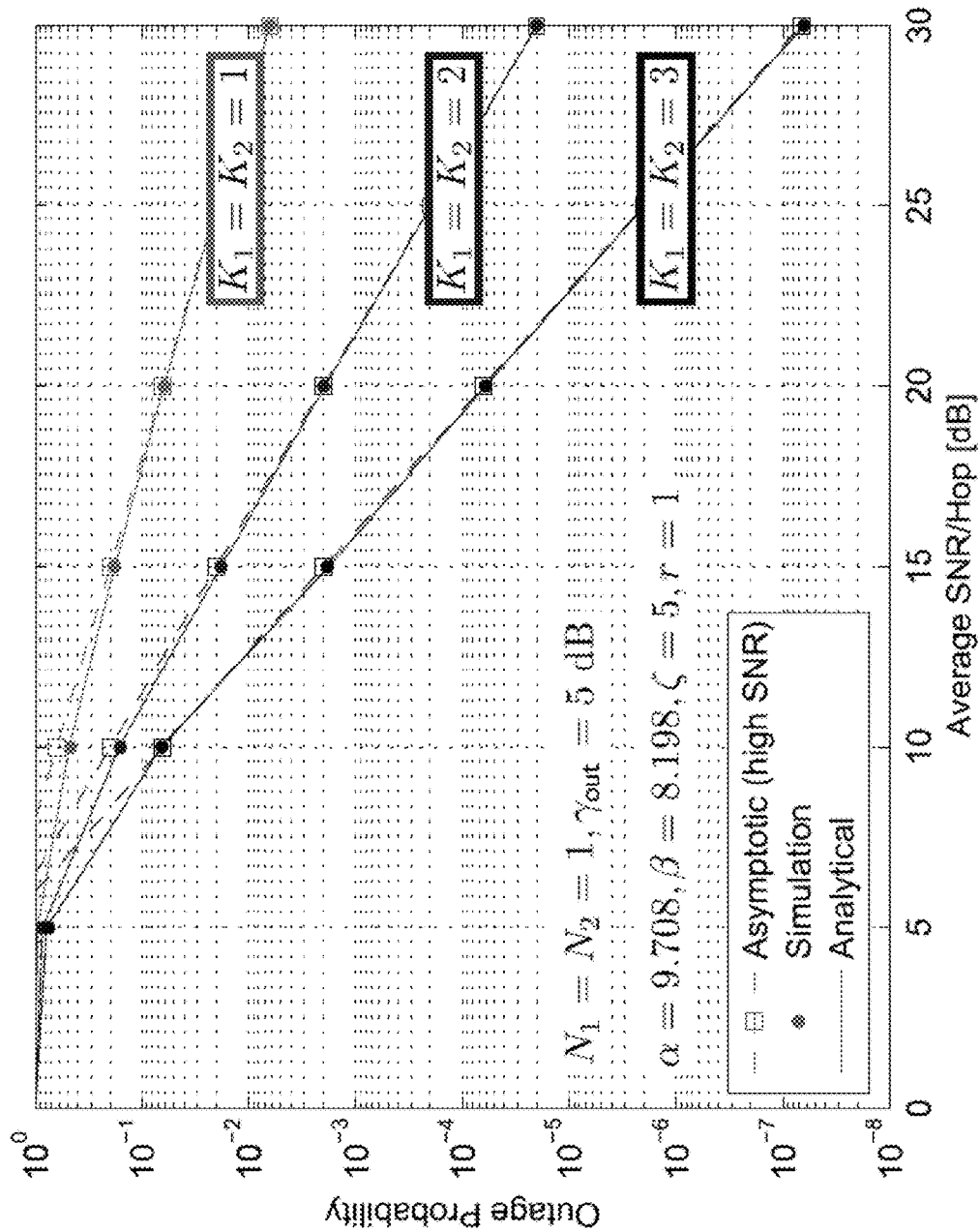
FIG. 4 is a graphical representation of system outage probability versus SNR of a multiuser mixed RF/FSO/RF relay network with generalized order user scheduling for different values of $K_1=K_2$ according to one or more aspects of the disclosed subject matter.

FIG. 4 is a graphical representation of the outage probability of the system under weak turbulence conditions when the number of sources and destinations is varied but equal ($K_1=K_2$). Under weak turbulence conditions ($\alpha=9.708$ and $\beta=8.198$) or as $K_1=K_2$ increases (number of available sources and destinations increases), overall system performance improves. Again, during weak turbulence, the RF links drive system performance and the diversity order is equal to $K_1-N_1+1=K_2-N_2+1$. In other words, for fixed order of selection of source and destination ($N_1=N_2$), an increasing $K_1=K_2$ increases diversity order of the system and improves system performance.

Figure 5:
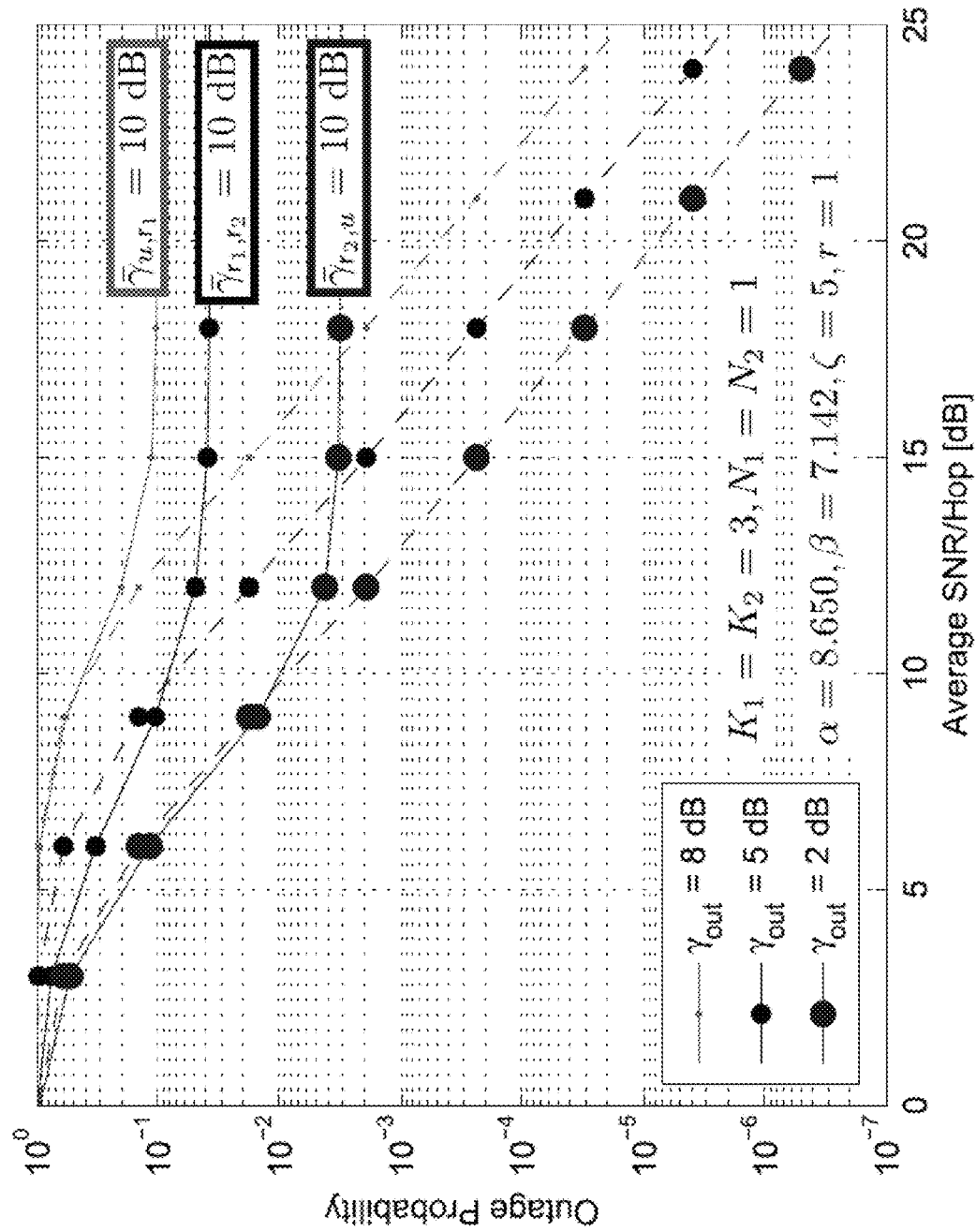
FIG. 5 is a graphical representation of system outage probability versus SNR of a multiuser mixed RF/FSO/RF relay network with generalized order user scheduling for different values of $\gamma_{out}$ with fixed average SNRs and varying average SNRs according to one or more aspects of the disclosed subject matter.

FIG. 5 is a graphical representation of outage probability of the system compared with average SNR at each hop under weak turbulence conditions ($\alpha=8.650$ and $\beta=7.142$) and for different values of the SNR outage threshold $\gamma_{out}$. Two specific cases were evaluated: (1) all links' average SNRs increase with increasing x-axis value and (2) one link's average SNR is fixed. In the case (1) where all SNRs are variable, the performance of the system is not limited and enhances as SNR increases. In the case (2) where one link has a fixed SNR, a noise floor appears in the results and outage probability is dominated by this worst link among the three. From FIG. 5, it is apparent that changes to the outage threshold $\gamma_{out}$ affect only the coding gain of the system.

Figure 6:
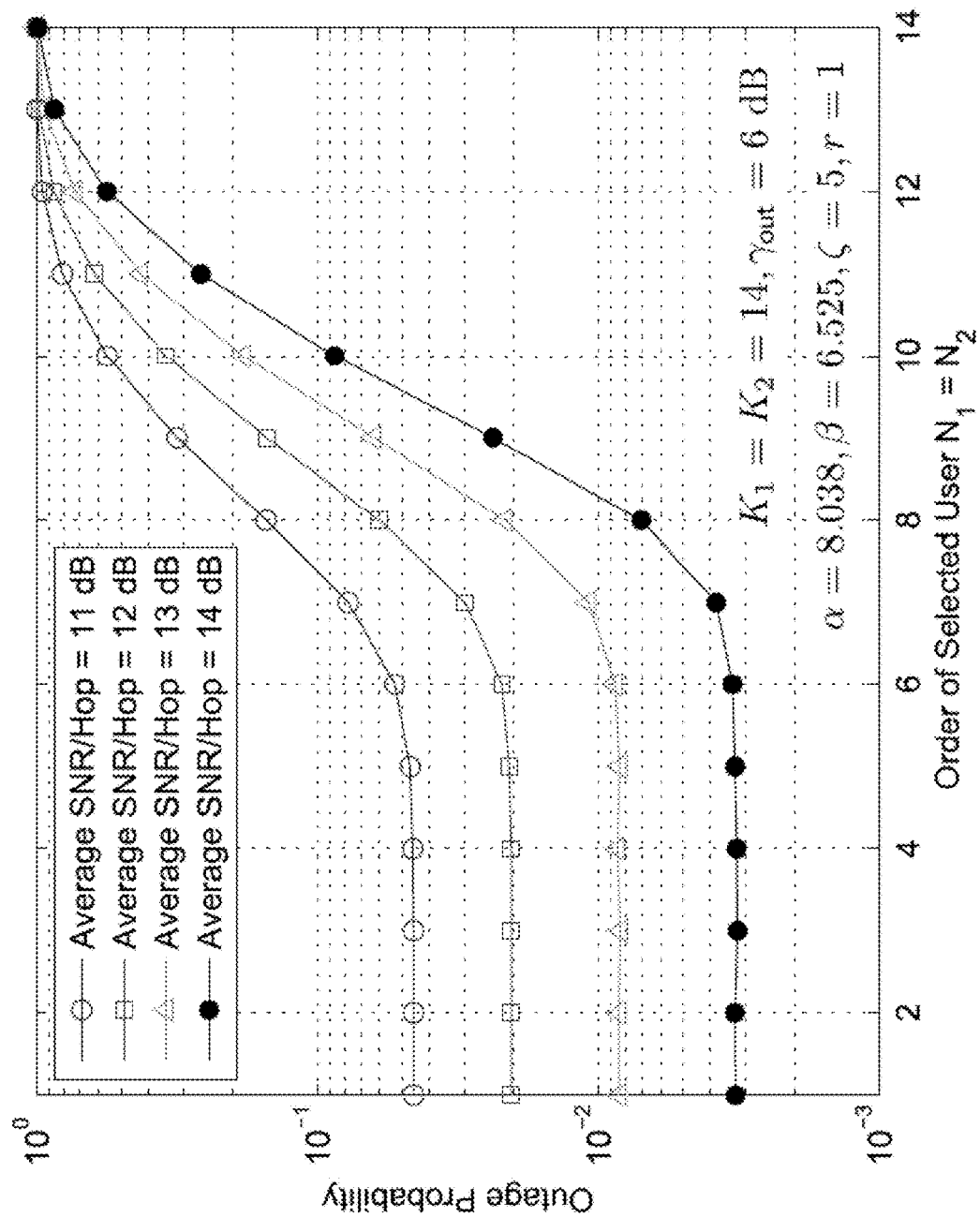
FIG. 6 is a graphical representation of system outage probability versus order of selected user of multiuser mixed RF/FSO/RF relay network with generalized order user scheduling for different values of average SNR according to one or more aspects of the disclosed subject matter.

FIG. 6 is a graphical representation of the outage probability of the system compared with order of selected source and destination ($N_1=N_2$) under weak turbulence conditions ($\alpha=8.038$ and $\beta=6.525$) for variable values of average SNR per hop. As $N_1=N_2$ increases (as the quality of the selected source and destination decreases), the outage probability of the system increases and system performance degrades.

Figure 7:
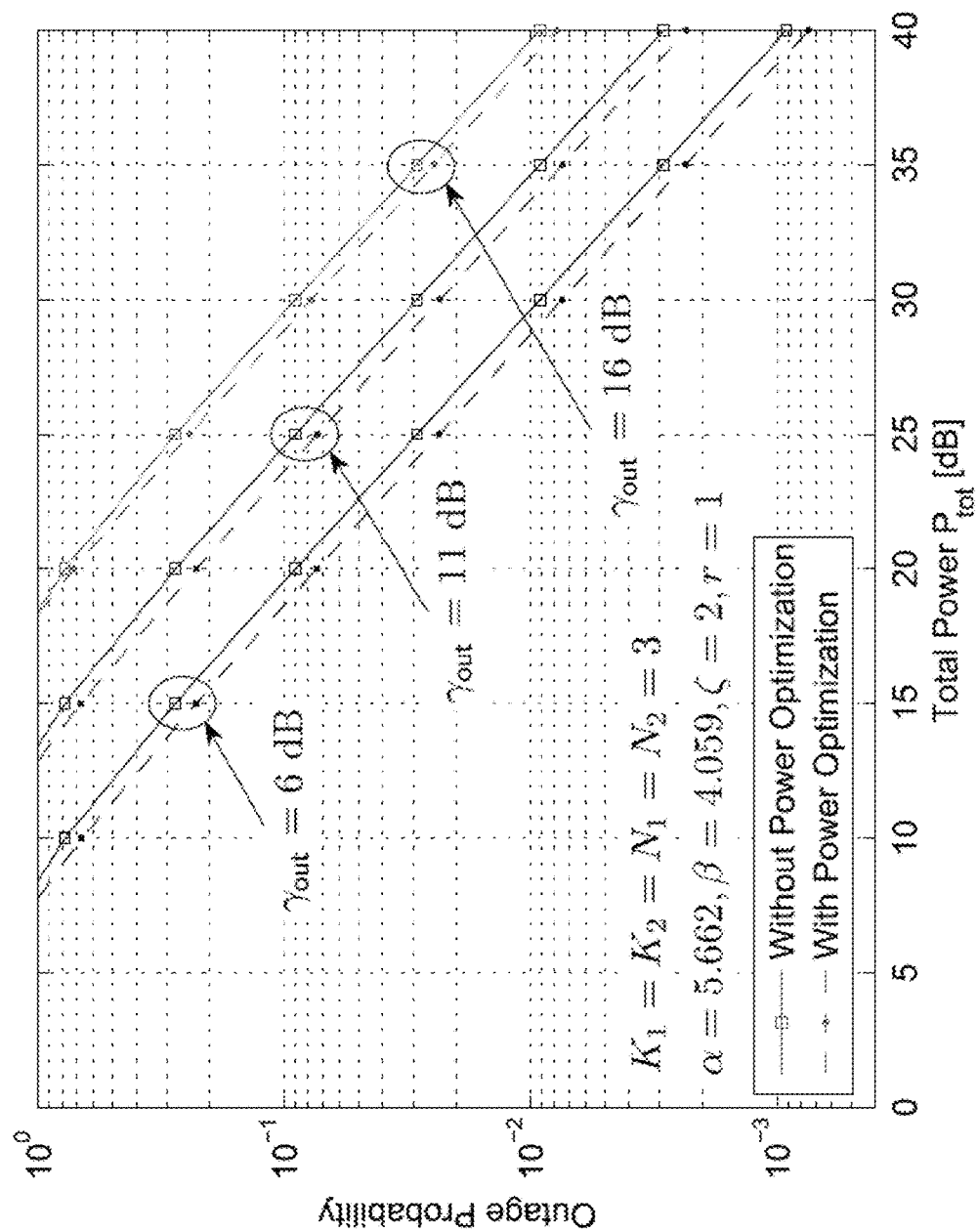
FIG. 7 is a graphical representation of system outage probability versus SNR of multiuser mixed RF/FSO/RF relay network with generalized order user scheduling for different values of $\gamma_{out}$ with and without power optimization according to one or more aspects of the disclosed subject matter.

FIG. 7 is a graphical representation of the impact of the proposed power allocation algorithm under weak turbulence conditions ($\alpha=5.662$ and $\beta=4.059$) and for variable values of outage threshold $\gamma_{out}$. The dashed lines, representing power optimization, improve system performance by decreasing outage probability of the system. Further, by increasing the outage threshold $\gamma_{out}$, system performance is degraded by reducing the coding gain of the system and not the diversity order. In determining power allocation, the total distance ($D_{tot}$) between the sources and destinations was assumed to be 1 and divided as $D_{s,r_1}=0.3$, $D_{r_1,r_2}=0.3$, and $D_{r_2,d}=0.4$.

Figure 8:
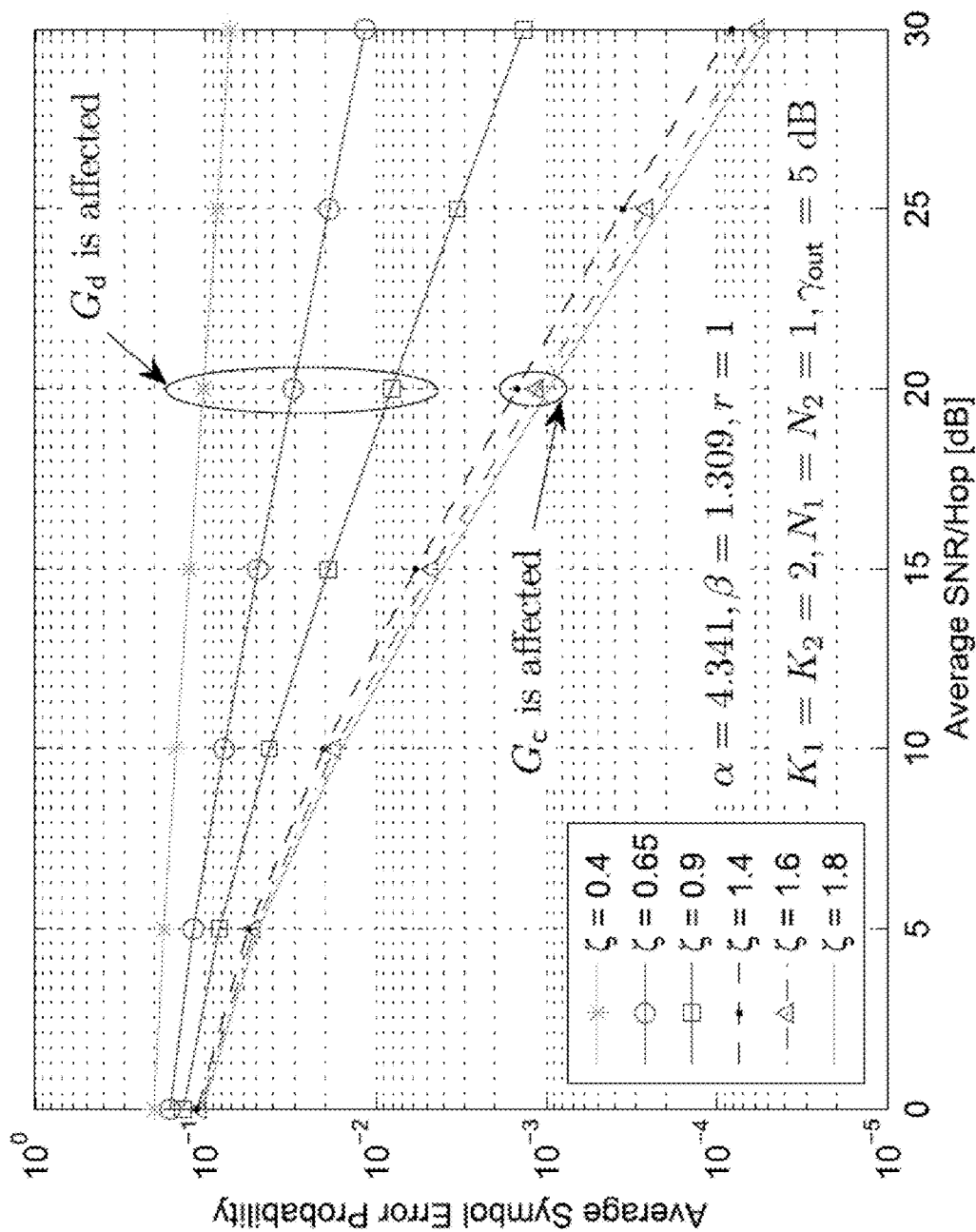
FIG. 8 is a graphical representation of system average symbol error probability versus SNR of a multiuser mixed RF/FSO/RF relay network with generalized order user scheduling for different values of $\zeta$ according to one or more aspects of the disclosed subject matter.

FIG. 8 is a graphical representation of the impact of pointing error ($\zeta$) on the average symbol error probability of the system under sever atmospheric turbulence conditions ($\alpha=4.341$ and $\beta=1.309$). Under severe atmospheric turbulence conditions, system performance is dominated by performance of the FSO link and its corresponding parameters ($\alpha$, $\beta$, and $\zeta^2$). FIG. 8 can be divided into two sets of curves where (1) diversity order is affected by changing $\zeta$ and where (2) coding gain is affected by changing $\zeta$. When $\zeta^2$ is the smallest parameter, $G_d$ of the system is impacted. When $\zeta$ is larger than $\beta$, changes in $\zeta$ affect the $G_c$ of the system and $G_d$ is determined by $\beta$.

Figure 9:
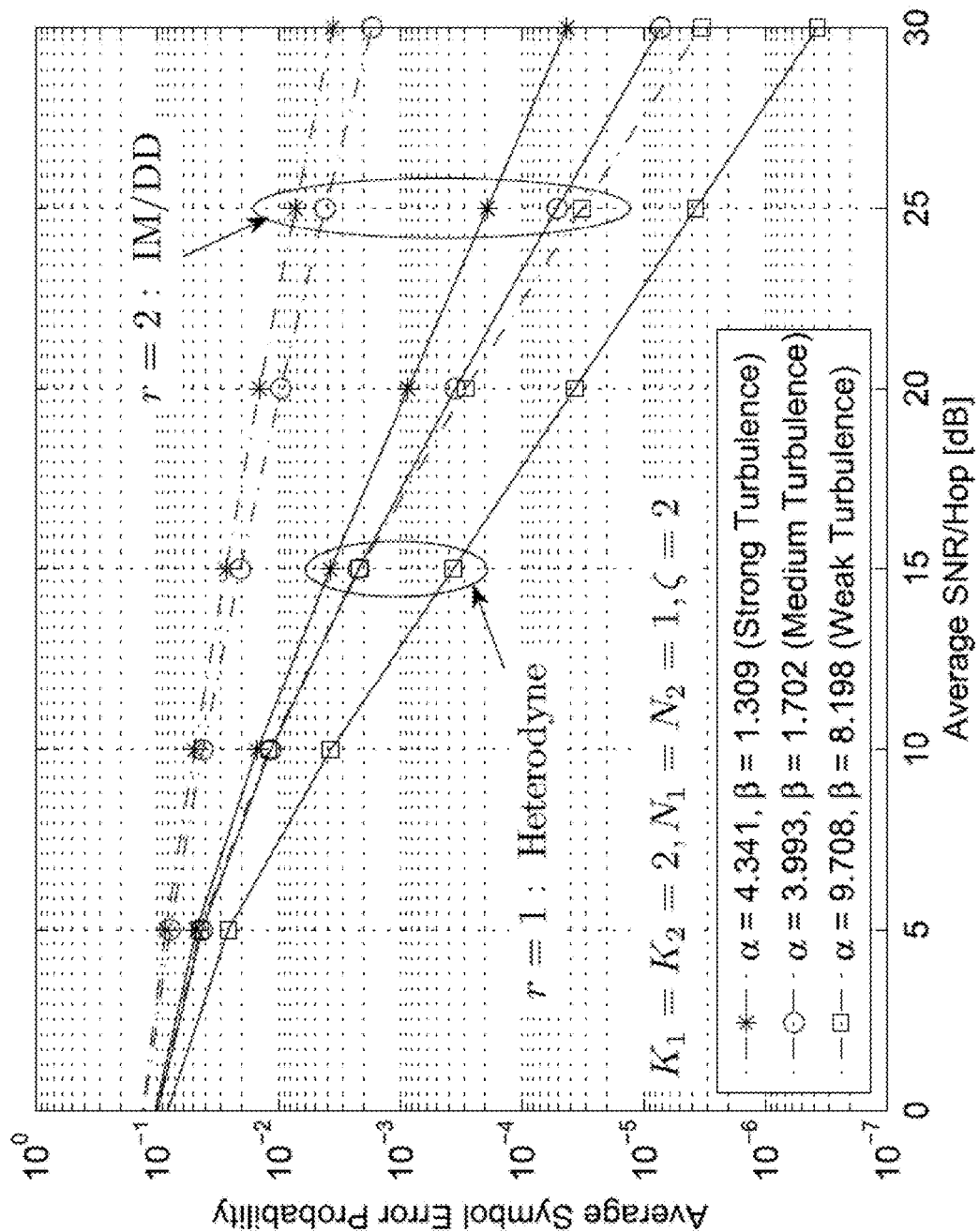
FIG. 9 is a graphical representation of system average symbol error probability versus SNR of a multiuser mixed RF/FSO/RF relay network with generalized order user scheduling for different values of $\alpha$, $\beta$, and r according to one or more aspects of the disclosed subject matter.

FIG. 9 is a graphical representation of the impact of FSO detection type (heterodyne or intensity modulation/direct detection) on the average symbol error probability when compared with average SNR per hop under variable atmospheric conditions. Due to minimal sensitivity to thermal noise, heterodyne detection improves system performance while increasing system complexity.

Figure 10:
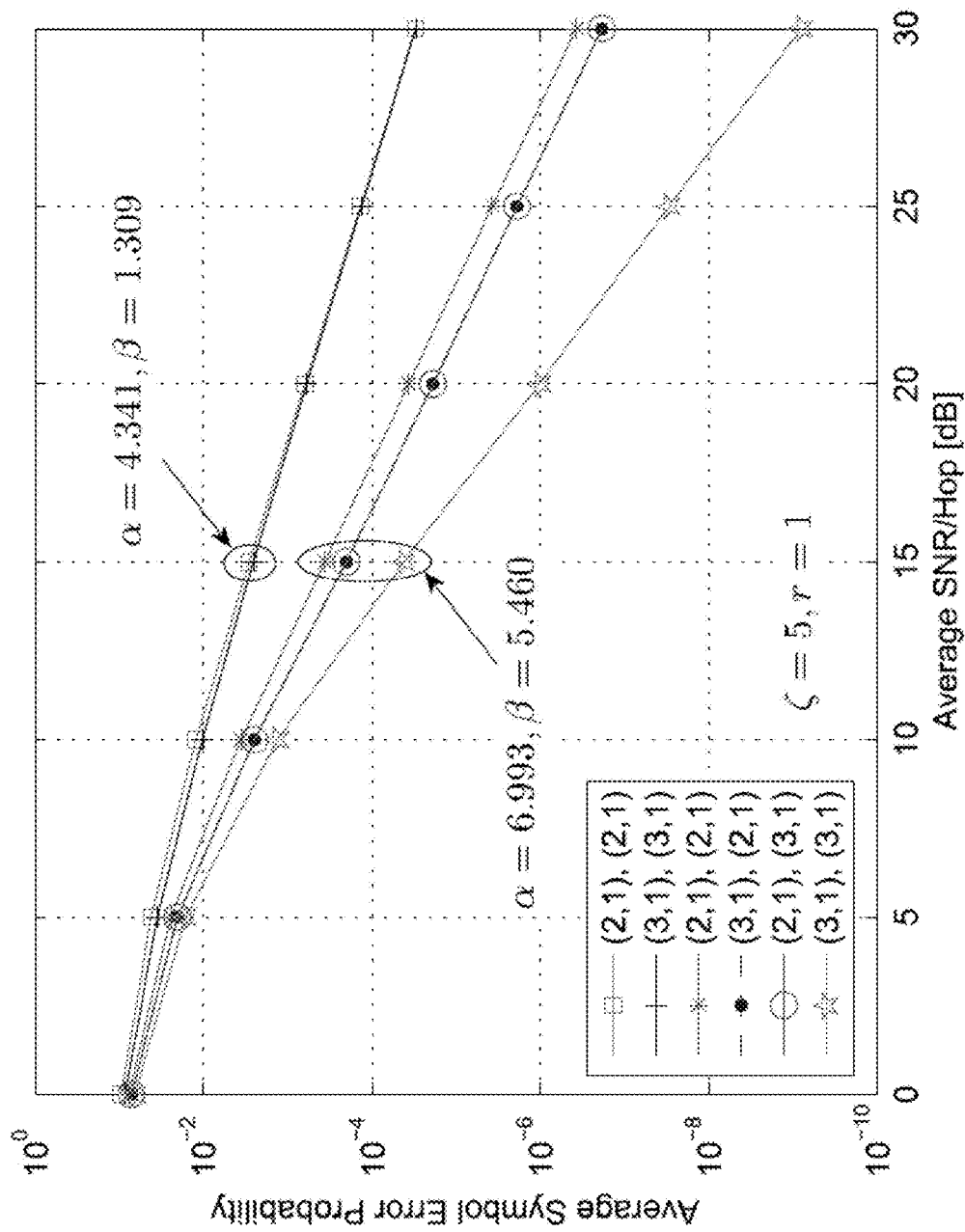
FIG. 10 is a graphical representation of system average symbol error probability versus SNR of a multiuser mixed RF/FSO/RF relay network with generalized order user scheduling for different values of $(K_1, N_1)$ and $(K_2, N_2)$ according to one or more aspects of the disclosed subject matter.

FIG. 10 is a graphical representation of the outage probability of the system when the number of sources $K_1$ and destinations $K_2$ and order of selected sources $N_1$ and destinations $N_2$ is varied. Further, the additional impact of varied atmospheric turbulence conditions is considered. Under severe atmospheric turbulence conditions, increasing $K_1=K_2$ does not improve diversity order or coding gain of the system as system performance is dominated by the performance of the FSO link. Under weak turbulence conditions, when the weakest links of the network are the RF links, diversity order and coding gain are dominated by the RF link parameters ($K_1$, $N_1$, $K_2$, and $N_2$). The diversity order of the system is determined by the minimum value amongst the terms $K_1-N_1+1$ and $K_2-N_2+1$. Increasing only one value improves the coding gain, while increasing all values raises the minimum value and improves diversity gain.

Figure 11:
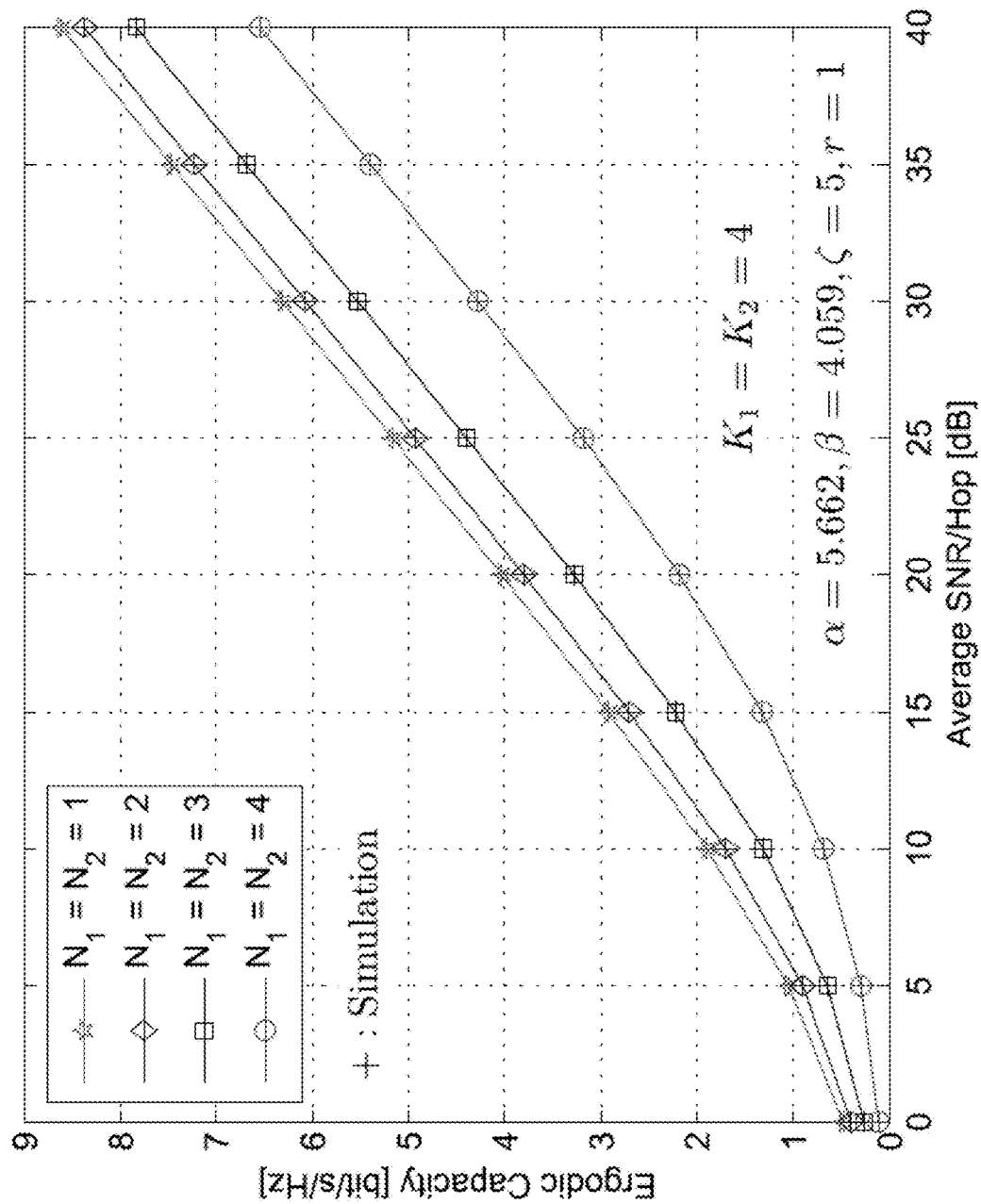
FIG. 11 is a graphical representation of ergodic capacity versus SNR of a multiuser mixed RF/FSO/RF relay network with generalized order user scheduling for different values of $N_1=N_2$ according to one or more aspects of the disclosed subject matter.

FIG. 11 is a graphical representation of the ergodic capacity of the network compared with average SNR per hop under weak atmospheric conditions for varying values of $N_1=N_2$. By increasing the quality of the source and destination selected, or by decreasing $N_1=N_2$, system capacity is improved.

Figure 12:
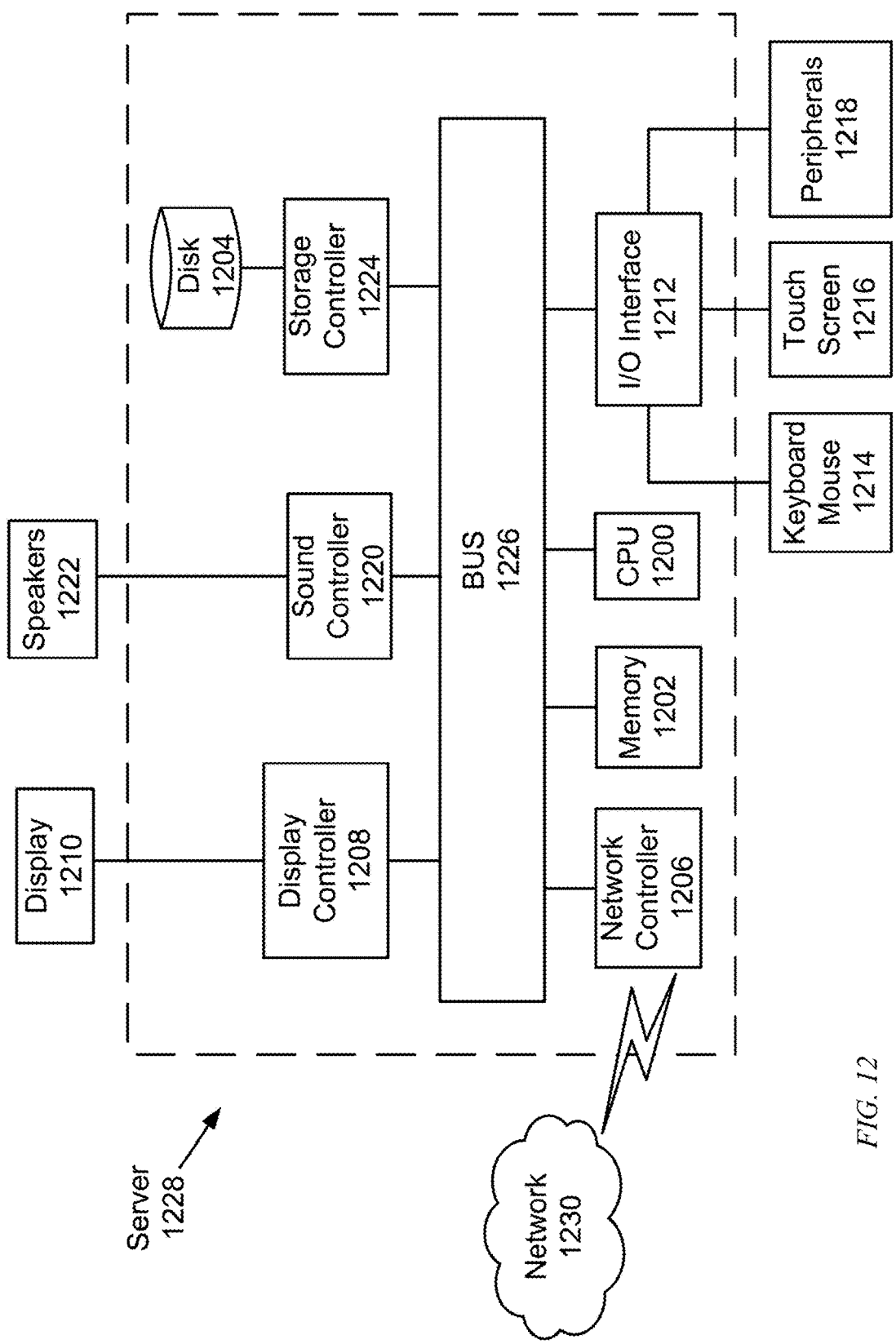
FIG. 12 is a hardware block diagram of a server according to one or more exemplary aspects of the disclosed subject matter.

FIG. 12 provides a hardware description of the system for wireless network communication according to exemplary embodiments. In FIG. 12, the system for wireless network communication includes a CPU 1200 which performs the processes (user selection, decoding, etc.) described above. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the system for wireless network communication communicates, such as a server or computer.

Further, the claimed advancements may be provided as a utility application, background daemon, or component of an operating system, or combination thereof, executing in conjunction with CPU 1200 and an operating system such as Microsoft Windows, UNIX, Solaris, LINUX, Apple MAC-OS and other systems known to those skilled in the art.

The hardware elements in order to achieve the system for wireless network communication may be realized by various circuitry elements, known to those skilled in the art. For example, CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The system for wireless network communication in FIG. 12 also includes a network controller 1206, such as an Intel Ethernet PRO network interface card from Intel Corporation of America, for interfacing with network 1230. As can be appreciated, the network 1230 can be a public network, such as the Internet, or a private network such as an LAN or WAN network, or any combination thereof and can also include PSTN or ISDN sub-networks. The network 1230 can also be wired, such as an Ethernet network, or can be wireless such as a cellular network including EDGE, 3G and 4G wireless cellular systems. The wireless network can also be WiFi, Bluetooth, or any other wireless form of communication that is known.

The system for wireless network communication further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the system for wireless network communication, such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the system for wireless network communication. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

It is notable that for each situation evaluated heretofore, analytical and asymptotic expressions are in match with simulation results.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present

19 invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for wireless network communication, comprising:
   a first plurality of wireless devices at a source configured to transmit or receive communication via radiofrequency;
   a second plurality of wireless devices at a destination configured to transmit or receive communication via radiofrequency;
   a first relay configured to communicate with a selected one of the first plurality of wireless devices at the source via radiofrequency and communicate with a second relay via free space optical communication, the second relay being configured to communicate with the first relay via free space optical communication and with a selected one of the second plurality of wireless devices at the destination via radiofrequency; and
   processing circuitry configured to
      select a wireless device at the source with the largest partially modeled source signal-to-noise ratio as the selected one of the first plurality of wireless devices,
      select a wireless device at the destination with the largest partially modeled destination signal-to-noise ratio as the selected one of the second plurality of wireless devices, wherein
      the partially modeled source signal-to-noise ratio is based on transmitted power, additive white Gaussian noise, and Rayleigh fading model-based channel coefficients, and
      the partially modeled destination signal-to-noise ratio is based on transmitted power, additive white Gaussian noise, and Rayleigh fading model-based channel coefficients.

2. The system for wireless network communication of claim 1, wherein the radiofrequency communication of the first plurality of wireless devices at the source is mmWave radiofrequency communication.

3. The system for wireless network communication of claim 1, wherein the radiofrequency communication of the first relay is mmWave radiofrequency communication.

4. The system for wireless network communication of claim 1, wherein the first relay employs a decode and forward scheme.

5. The system for wireless network communication of claim 1, wherein the second relay employs a decode and forward scheme.

6. The system for wireless network communication of claim 1, wherein the radiofrequency communication of the second relay is mmWave radiofrequency communication.

7. The system for wireless network communication of claim 1, wherein the radiofrequency communication of the second plurality of wireless devices at the destination is mmWave radiofrequency communication.

8. The system according to claim 1, wherein the Rayleigh fading model-based channel coefficients are exponentially distributed random variables.

9. The system according to claim 1, wherein the processing circuitry is further configured to

20 calculate a partially modeled signal-to-noise ratio for the free space optical communication, the calculated partially modeled signal-to-noise ratio being determined in accordance with a Gamma-Gamma fading model.

10. The system according to claim 9, wherein the Gamma-Gamma fading model is a unified Gamma-Gamma fading model including pointing errors.

11. The system according to claim 1, wherein a transmission power of the selected one of the first plurality of wireless devices is calculated as $$P^*_{s,r_1} = \frac{d^{\mu}_{s,r_1} \gamma_{out} P_{tot}}{\gamma_{out}(d^{\mu}_{s,r_1} + d^{\mu}_{r_2,d}) + [ABd^{\mu}_{r_1,r_2}\gamma_{out}]^{\frac{1}{2}}},$$

where $d_{s,r_1}^{\mu}$ is a distance between the source and the first relay, $\gamma_{out}$ is a predetermined outage threshold signal-to-noise ratio, $P_{tot}$ is a sum power constraint, $d_{r_2,d}^{\mu}$ is a distance between the second relay and the destination, and $d_{r_1,r_2}^{\mu}$ is a distance between the first relay and the second relay.

12. The system according to claim 11, wherein an outage probability of the communicated signal from the selected one of the first plurality of wireless devices to the first relay is calculated as $$F_{\gamma U_{Sel},R_1}(\gamma) = K_1 \binom{K_1-1}{N_1-1} \sum_{k=0}^{K_1-N_1} \frac{\binom{K_1-N_1}{k}(-1)^k}{(k+N_1)} \times [1 - \exp(-(k+N_1)\lambda_{u,r_1}\gamma],$$

where $N_1$ is an order of the selected one of the first plurality of wireless devices, $K_1$ is at total number of the first plurality of wireless devices at the source, k is a number of a user, and $\gamma$ is a partially modeled signal-to-noise ratio.

13. The system according to claim 12, wherein the transmission power of the selected one of the first plurality of wireless devices is determined such that the outage probability, among the first plurality of wireless devices, of the communicated signal is minimized.

14. A method of wireless network communication, comprising:
   selecting, by processing circuitry, one of a first plurality of wireless devices at a source, the selected one of the first plurality of wireless devices being a wireless device at the source with the largest partially modeled source signal-to-noise ratio;
   transmitting, by the processing circuitry, a communication of the selected one of the first plurality of wireless devices to a first relay via radiofrequency;
   receiving and decoding, by the processing circuitry, the transmitted radiofrequency communication from the selected one of the first plurality of wireless devices at the first relay;
   forwarding, by the processing circuitry, the decoded communication from the first relay to a second relay via free space optical communication;
   receiving and decoding, by the processing circuitry, the forwarded free space optical communication from the first relay at the second relay;
   selecting, by the processing circuitry, one of a second plurality of wireless devices at a destination, the selected one of the second plurality of wireless devices being a wireless device at the destination with the largest partially modeled destination signal-to-noise ratio; and transmitting, by the processing circuitry, the decoded communication from the second relay to the selected one of the second plurality of wireless devices at the destination via radiofrequency, wherein the partially modeled source signal-to-noise ratio is based on transmitted power, additive white Gaussian noise, and Rayleigh fading model-based channel coefficients, and the partially modeled destination signal-to-noise ratio is based on transmitted power, additive white Gaussian noise, and Rayleigh fading model-based channel coefficients.

15. The method of wireless network communication of claim 14, wherein the radiofrequency communication of the selected one of the first plurality of wireless devices at the source is mmWave radiofrequency communication.

16. The method of wireless network communication of claim 14, wherein the radiofrequency communication received by the first relay is mmWave radiofrequency.

17. The method of wireless network communication of claim 14, wherein the radiofrequency communication transmitted by the second relay is mmWave radiofrequency.

18. The method of wireless network communication of claim 14, wherein the radiofrequency communication received by the selected one of the second plurality of wireless devices at the destination is mmWave radiofrequency.

* * * * *